(12) United States Patent
Frey et al.

(10) Patent No.: US 9,014,034 B2
(45) Date of Patent: Apr. 21, 2015

(54) EFFICIENT NETWORK TRAFFIC ANALYSIS USING A HIERARCHICAL KEY COMBINATION DATA STRUCTURE

(71) Applicant: Cisco Technology, Inc., San Jose, CA (US)

(72) Inventors: Clifford A. Frey, San Francisco, CA (US); Brandon Smyth, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 13/624,785

(22) Filed: Sep. 21, 2012

(65) Prior Publication Data

US 2014/0086069 A1    Mar. 27, 2014

(51) Int. Cl.
  *H04J 1/16*       (2006.01)
  *H04L 12/26*      (2006.01)

(52) U.S. Cl.
  CPC ............ *H04L 43/026* (2013.01); *H04L 43/045* (2013.01); *H04L 43/062* (2013.01)

(58) Field of Classification Search
  None
  See application file for complete search history.

(56) References Cited

U.S. PATENT DOCUMENTS

| | | | | |
|---|---|---|---|---|
| 2003/0005112 | A1* | 1/2003 | Krautkremer | 709/224 |
| 2008/0037546 | A1* | 2/2008 | Ishikawa et al. | 370/392 |
| 2010/0229048 | A1* | 9/2010 | Karam | 714/48 |
| 2011/0122792 | A1* | 5/2011 | Duffield et al. | 370/252 |
| 2013/0223431 | A1* | 8/2013 | Sugarman | 370/352 |

OTHER PUBLICATIONS

Erik D. Demaine, et al., "Frequency Estimation of Internet Packet Streams with Limited Space," 2002, 12 Pages.

* cited by examiner

*Primary Examiner* — Dang Ton
*Assistant Examiner* — Ronald H Davis
(74) *Attorney, Agent, or Firm* — Novak Druce Connolly Bove + Quigg LLP

(57) ABSTRACT

A network access device for network traffic analysis of a plurality of client devices in a local area network (LAN) maintains a hierarchical key combination traffic analysis (HKCTA) table for each of the client devices of the LAN (LAN devices) to store network traffic statistics of each LAN device, wherein the HKCTA includes entries identified by keys, each key being formed based on a combination of zero or more packet attributes of packets or flow attributes of a network flow associated with the packets (packet/flow attributes) exchanged by the LAN device. Each key represents one of hierarchical levels of a hierarchy of the entries. Each level of the hierarchy includes all packet/flow attributes of its parent hierarchical level plus at least one additional packet/flow attribute that is not present in its parent hierarchical level.

24 Claims, 16 Drawing Sheets

Key Definitions 203

| Key Type ID 401 | Flow/Packet Attributes 402 | | | | | | | |
|---|---|---|---|---|---|---|---|---|
| | Hostname 403 | Port 404 | Protocol 405 | | | | | |
| Hostname — 410 | E | — | — | ⋮ | | | | |
| Hostname/Protocol — 411 | — | — | E | ⋮ | | | | |
| Hostname/Port/Protocol — 412 | — | E | E | ⋮ | | | | |
| Port — 413 | — | — | — | ⋮ | | | | |
| Port/Protocol — 414 | E | — | E | ⋮ | | | | |
| Protocol — 415 | E | E | — | ⋮ | | | | |
| — 416 | E | E | — | ⋮ | | | | |
| Total | ⋮ | ⋮ | ⋮ | ⋮ | | | | |

FIG. 4

TA Table 113

| Key ID 501 | Traffic Measure Weighted in Favor of Recent Traffic 502 | Traffic Statistic Parameters 503 | | | | |
|---|---|---|---|---|---|---|
| | | RX 504 | TX 505 | Time | # of Flows | # of HTTP Req |
| Total | 100 | 80 | 20 | | | |
| ─ TCP/IP | 100 | 80 | 20 | | | |
| ─ Google.com | 90 | 75 | 15 | | | |
|  └ Google.com, port 80, TCP/IP | 80 | 70 | 10 | | | |
| ─ Port 443, TCP/IP | 10 | 5 | 5 | | | |
|  └ Google.com, Port 443, TCP/IP | 10 | 5 | 5 | | | |
| ⋮ | ⋮ | ⋮ | ⋮ | ⋮ | ⋮ | ⋮ |

Columns 510, 511, 512, 513, 514

FIG. 5

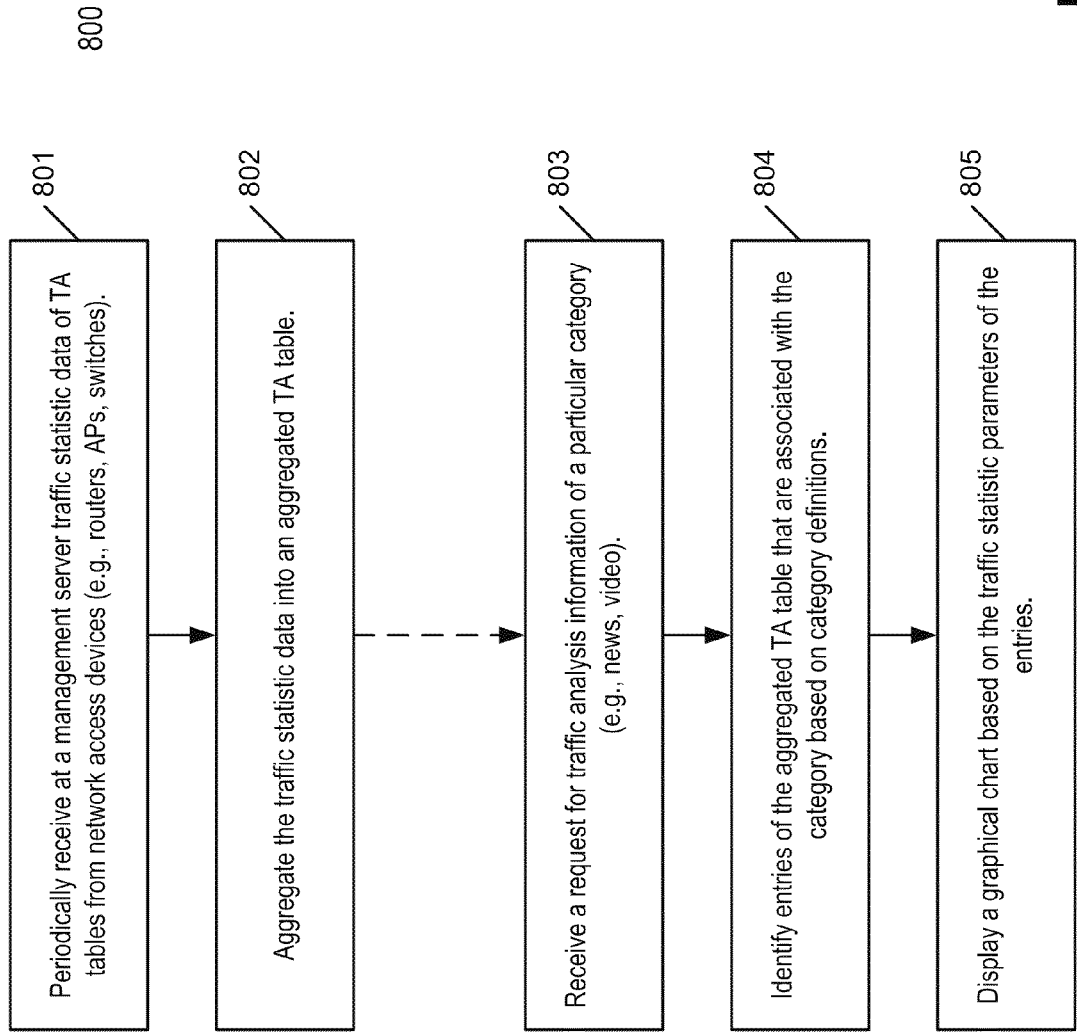

**FIG. 9C
(Prior Art)**

EFFICIENT NETWORK TRAFFIC ANALYSIS USING A HIERARCHICAL KEY COMBINATION DATA STRUCTURE

FIELD OF THE INVENTION

Embodiments of the present invention relate generally to network traffic analysis. More particularly, embodiments of the invention relate to efficient network traffic analysis using a hierarchical key combination data structure.

BACKGROUND

Networks, including local area networks (LAN) and wide area networks (WAN), are becoming increasingly prevalent as the number of computers in organizations grows. The traffic which passes through such a network may be monitored in order to maintain an efficient network. The flow of packets through the network is analyzed by detecting packets as they are transported from point to point on the network.

Many traffic analysis solutions today have a set of predefined categories of traffic and track usage for each one of these categories individually. The predefined category methods can quickly grow out of date. For example, if a new video sharing site shows up tomorrow, it is unlikely that there will be a category defined for the new video site right away. In addition, such solutions do not work well for local resources. For example, if a local network has a specific backup server running on a non-standard port, it is unlikely that a category will be defined soon enough for that type of traffic. Conventional methods that attempt to remember every flow or a certain number of sampled packets suffer from potentially unbounded memory use.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating an example of a key definition data structure according to one embodiment of the invention.

FIG. 5 is a block diagram illustrating an example of a traffic analysis data structure according to one embodiment of the invention.

FIG. 8 is a flow diagram illustrating a method performed by a management server according to one embodiment of the invention.

FIGS. 9A-9F are screenshots illustrating examples of graphical user interfaces (GUIs) presented by a conventional system and by a management server according to certain embodiments of the invention.

DETAILED DESCRIPTION

Figure 1:
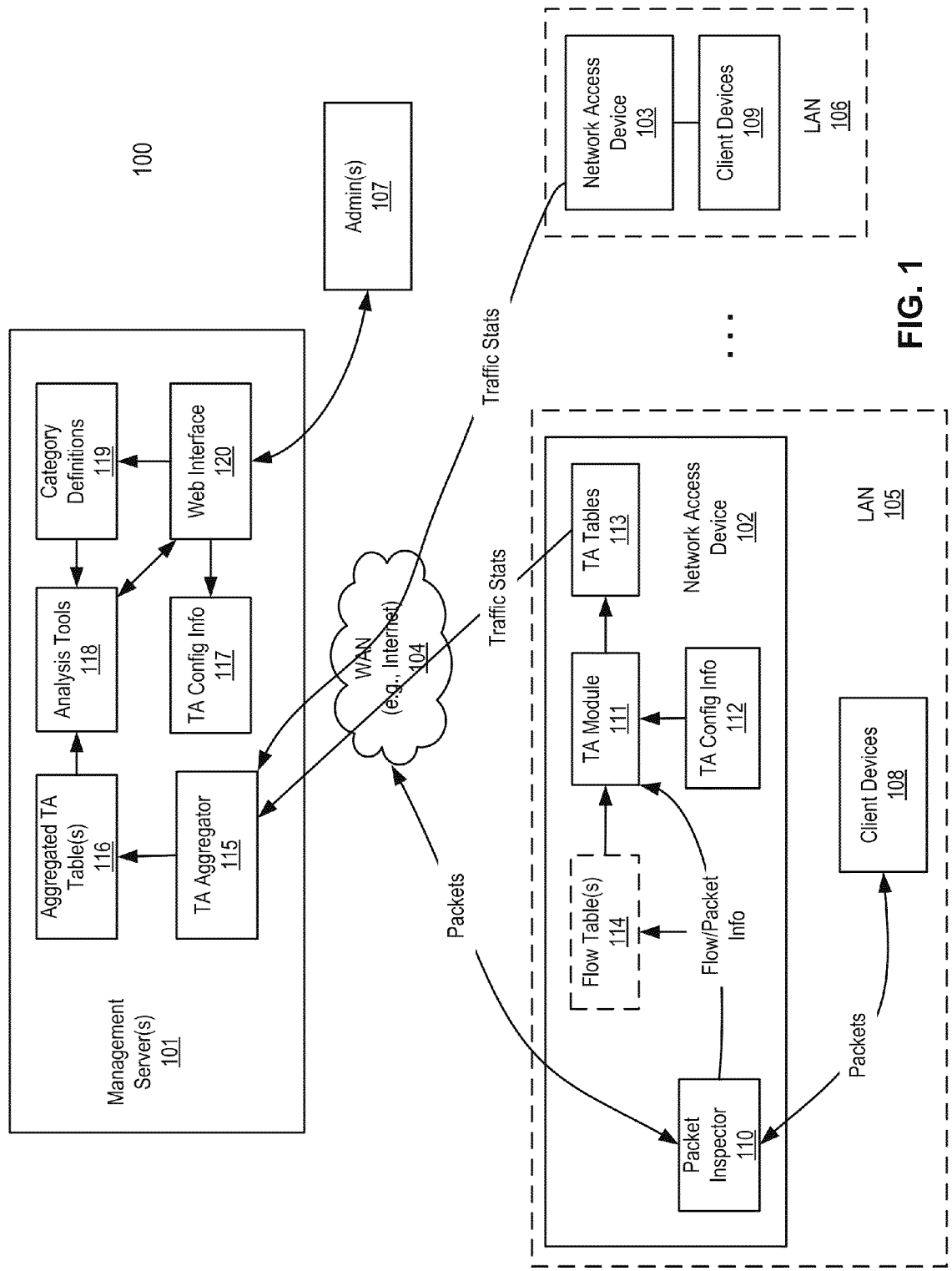
FIG. 1 is a block diagram illustrating a cloud managed network system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a traffic analysis (TA) data structure, also referred to herein as a hierarchical key combination traffic analysis (HKCTA) table, is maintained by each network access device for each client device of a LAN associated with the network access device (also referred to as a LAN device). A network access device may be a router, an access point (AP), a switch, or a combination thereof. The TA data structure contains a dynamic set of categories and associated counters. A network access device will track only up to a fixed number of categories per client device to keep memory requirements. The set of categories is dynamic and is inferred from the traffic itself. Any one type of traffic that accounts for a significant percent of the recent total amount of traffic seen by a client is guaranteed to have an associated category. This TA data structure is periodically read and/or sampled by a management server over the Internet (e.g., a cloud server or cloud controller) and data can be simply aggregated by the management server across many network access devices, or aggregated for all clients, or aggregated over time.

In one embodiment, the TA data structure includes multiple entries, where each entry represents one of multiple hierarchical levels of one or more hierarchies. Each entry is identified or referenced based on a key that is generated based on a unique combination of one or more packet attributes and/or flow attributes (packet/flow attributes), such as hostname, port, and protocol, etc. At least some of the attributes may be generated by an analyzer that analyzes outputs from layer 7 of a network stack, including, for example, flow-is-bittorrent or HTTP-content-type attributes. Different combinations of packet/flow attributes form different levels of a hierarchy and/or different hierarchies. The packet/flow attributes are used to define key types (e.g., hostname, port, protocol), where the actual keys are generated based on the real time traffic packet/flow attributes (e.g., google.com, port 80, TCP/IP protocol) dynamically. A key of a particular hierarchical level is generated based on one or more packet/flow attributes that include all packet/flow attributes of its parent hierarchical level used to form a parent key, plus at least one additional packet/flow attribute that is not present in its parent hierarchical level. Another word, a key of a particular hierarchical level is generated based on one or more packet/flow attributes that do not include at least one packet/flow attribute present in its child hierarchical level (if there is such a child hierarchical level).

According to one embodiment, TA data structure stores traffic statistics data of a corresponding LAN device such as an amount of traffic transmitted by the LAN device (referred to as TX traffic) and an amount of traffic received by the LAN device (referred to as RX traffic). The traffic statistics may be periodically transmitted from each network access device to a management server over the Internet. The management server is configured to manage multiple network access devices over the Internet, to collect traffic statistics from each of the network access devices, and to aggregate the traffic statistics into an aggregated TA data structure maintained within the management server. The management server further provides a set of management tools via a Web interface to allow a user, such as an administrator, to perform certain traffic analysis based on the traffic statistics data from the aggregated TA data structure, such as display specific traffic statistics based on a particular packet/flow attribute or attributes, which may be represented by a particular hierarchical level of the TA data structure. A TA data structure may be implemented in a variety of forms such as tables, database, etc. Throughout this application, a HKCTA table is utilized as an example of a TA table; however, other types of data structures may also be applied.

FIG. 1 is a block diagram illustrating a cloud managed network system according to one embodiment of the invention. Referring to FIG. 1, system 100 includes, but is not limited to, various network access devices (NADs) 102-103 (which may be wired and/or wireless) managed by a management server (MS) 101 over WAN 104, where WAN 104 may be the Internet. Management server 101 may be a Web or cloud server, or a cluster of servers, running on server hardware. For example, management server 101 may be server used to manage network access devices. It could be a Web or cloud server, a cluster of servers, or it could a network appliance. Each of network access devices 102-103 is associated with a LAN such as LANs 105-106. Network access devices 102-103 may operate as a gateway device, an access point (AP), a network switch, or a combination thereof to LANs 105-106, respectively, where various client devices 108-109 can be communicatively coupled to LANs 105-106. Note that for the purpose of illustration, although network access device 103 is not shown with details therein, network access device 103 has the same or similar architecture as network access device 102. For the purpose of illustration, only two network access devices are shown. However, it is not so limited; additional network access devices may be coupled to network 104 and managed by management server 101.

According to one embodiment, network access device 102 includes a packet inspector 110 to inspect packets exchanged by each of LAN devices 108 and a TA module 111 to populate traffic statistics data of the packets into a HKCTA table 113 based on TA configuration information 112. TA configuration information 112 may be configured by an administrator such as administrator 107 and downloaded from management server 101 as part of TA configuration information 117. TA configuration information may include information specifying how HKCTA table 113 is constructed. In one embodiment, for each of LAN devices 108, a HKCTA table is maintained.

In one embodiment, HKCTA table 113 includes multiple entries, where each entry represents one of multiple hierarchical levels of one or more hierarchies. An example of HKCTA table 113 is shown in FIG. 5. Each entry of HKCTA table 113 is identified or referenced based on a key that is generated based on a unique combination of one or more packet attributes and/or flow attributes (packet/flow attributes), such as hostname, port, and protocol, etc. Different combinations of packet/flow attributes form different levels of a hierarchy and/or different hierarchies. The packet/flow attributes are used to define key types (e.g., hostname, port, protocol), where the actual keys are generated based on the real time traffic packet/flow attributes (e.g., google.com, port 80, TCP/IP protocol) dynamically. A key of a particular hierarchical level is generated based on zero or more packet/flow attributes that include all packet/flow attributes of its parent hierarchical level used to form a parent key, plus at least one additional packet/flow attribute that is not present in its parent hierarchical level. Another word, a key of a particular hierarchical level is generated based on one or more packet/flow attributes that do not include at least one packet/flow attribute present in its child hierarchical level (if there is such a child hierarchical level). According to one embodiment, which of the packet/flow attributes (e.g., hostname, port, protocol) should be utilized to construct the keys may be specified by TA configuration information 112. An example of TA configuration information is shown as a key definition data structure FIG. 4, which may be configured by an administrator. As shown in FIG. 4, root parent entry 410 is generated based on null key (e.g., generated based on zero packet/flow attribute), which is designed to track all traffic.

According to one embodiment, HKCTA table 113 stores traffic statistics data of a corresponding LAN device such as an amount of TX traffic transmitted by the LAN device and an amount of RX traffic received by the LAN device. The traffic statistics may be stored in multiple entries of HKCTA table 113 in a hierarchy structure dependent upon TA configuration information 112. For example, traffic exchanged via port 80 using TCP/IP protocol may be stored in a first entry that is keyed off based on port 80, a second entry keyed off based on TCP/IP protocol, and a third entry keyed off based on port 80 and TCP/IP protocol.

According to one embodiment, for each packet transmitted or received by any one of client devices 108, packet inspector 110 is to identify certain traffic information of the packet, such as an amount of traffic (e.g., TX or RX traffic) carried by the packet, a port (e.g., source and destination TCP or UDP ports), and the protocol (e.g., TCP/IP protocol) associated with the packet, as well as certain flow information of a flow associated with the packet, collectively referred to herein as packet/flow attributes. Packet inspect 110 passes the packet/flow attributes to TA module 111, where TA module populates HKCTA table 113 based on the packet/flow attribute information.

According to another embodiment, for each packet exchanged by any one of the client devices 108, packet inspector 110 is to inspect the packet to obtain packet/flow attribute information and store the packet/flow information in flow table 114. Subsequently, based on a preconfigured schedule, TA module 111 is to update HKCTA table 113 based on the traffic information from flow table 114. That is, the traffic information is buffered in flow table 114 without having to populate HKCTA table 113 for every single packet. The traffic information is then updated into HKCTA table, for example, every 30 seconds, as a batch process.

The traffic statistics (e.g., TX and RX traffic) may be periodically transmitted by TA module 111 from each network access device to management server 101 over WAN 104. According to one embodiment, management server 101 includes TA aggregator 115 to collect traffic statistics from each of the network access devices 102-103, and to aggregate the traffic statistics into an aggregated TA data structure 116 maintained within the management server 101. The management server 101 further provides a set of management tools, such as TA analysis tools 118, via a Web interface or API 120 to allow a user, such as administrator 107, to perform certain traffic analysis based on the traffic statistics data from the aggregated TA data structure 115, such as display specific traffic statistics based on a particular packet/flow attribute or attributes, which may be represented by a particular hierarchical level of the TA data structure 116.

Figure 2:
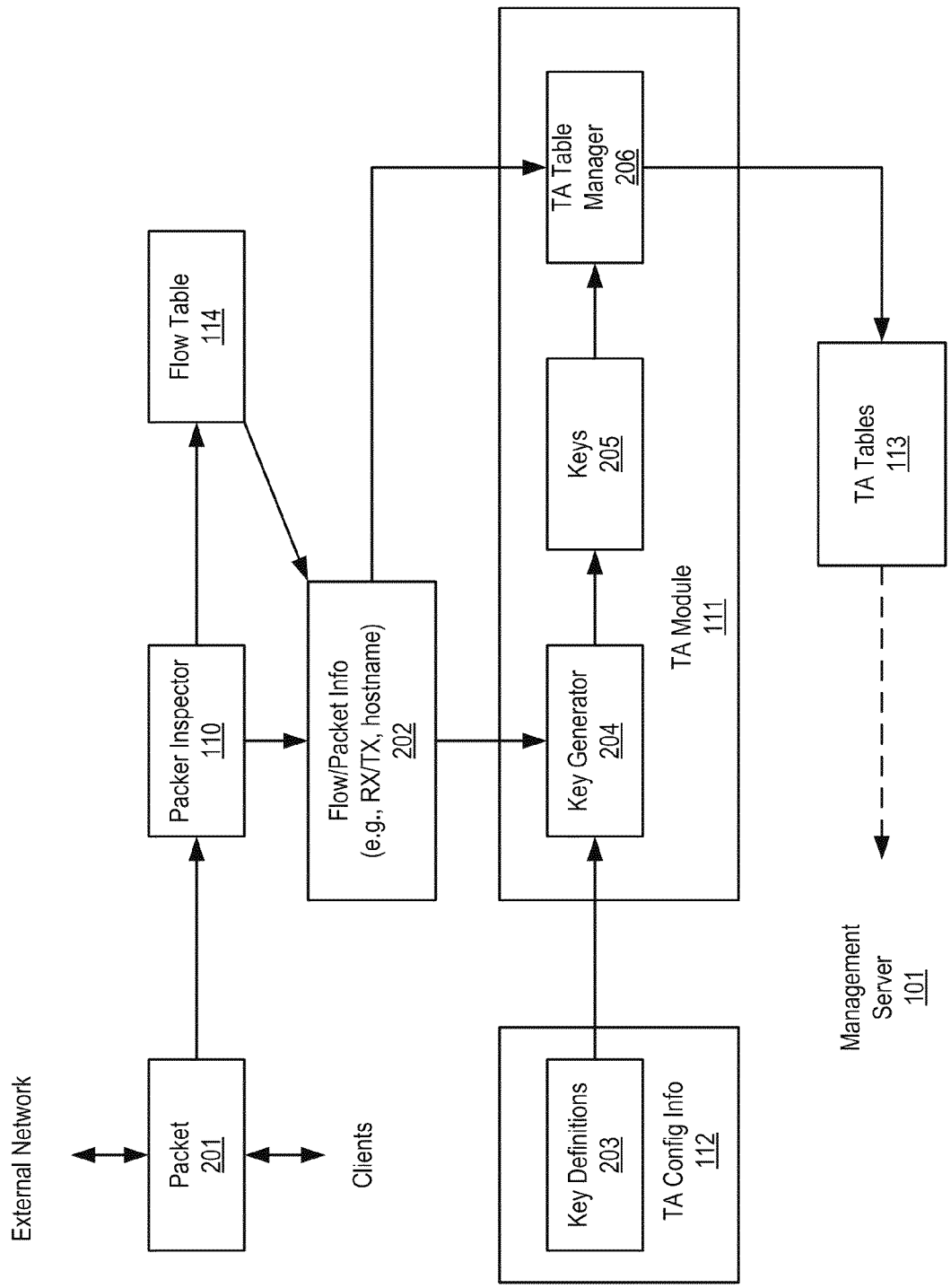
FIG. 2 is a block diagram illustrating an example of traffic analysis process according to another embodiment of the invention.

FIG. 2 is a block diagram illustrating an example of traffic analysis process according to another embodiment of the invention. System 200 may be implemented as part of any of network access devices 102-103 system 100 of FIG. 1. Referring to FIG. 2, when a packet 201 is received by packet inspector 110, it inspects the packet including examining the header of packet 201 to obtain packet/flow information or traffic data 202 from certain packet/flow attributes of packet 201. The packet/flow information 202 may include an amount of traffic carried by packet 201 (e.g., size of the packet and/or payload in bytes), a direction of packet 201 (e.g., RX or TX), source and destination IP addresses, source and destination port numbers (e.g., TCP/UDP port numbers), a protocol identifier identifying the protocol of packet 201 (e.g., TCP/IP, UDP protocols), a duration of the corresponding flow, etc.

Based on packet/flow information 202, according to one embodiment, key generator 204 of TA module 111 is to generate a set of keys 205 according to key definitions 203. Key definitions 203 define what keys should be generated based on which of the packet/flow attributes. As a described above, each of the keys represents a hierarchical level of a hierarchy in a corresponding TA table such as TA tables 113. Based on the keys 205, TA table manager 206 is to identify entries referenced by the keys 205 and to populate the packet/flow information 202 into a corresponding one of TA tables 113.

According to another embodiment, instead of updating TA table 113 for every single packet captured by packet inspector 110, packet inspector 110 is to inspect packet 201 to obtain the packet/flow traffic data from the packet/flow attributes of packet 201. Packet inspector 110 then updates the flow table 114 with the new traffic data from packet 201. Subsequently, according to a predetermined schedule (e.g., every 30 seconds), TA module 111 is to incorporate the traffic data from flow table 114 into TA tables 113. In this embodiment, packet/flow information 202 is obtained from flow table 114. Furthermore, this can be combined with statistical sampling. For example, packet inspector 110 may sample packets at a predetermined sampling rate X, and may give the packets 1/X as much weight/bytes when adding to TA tables 113.

Note that a network access device maintains multiple TA tables, each corresponding to one of the LAN devices associated with the network access device. When a packet is received, a LAN device is identified based on the packet such as an IP address or media control address (MAC) associated with the LAN device; a corresponding TA table associated with the LAN device is identified; and the packet/flow information is then populated in the TA table.

Figure 3:
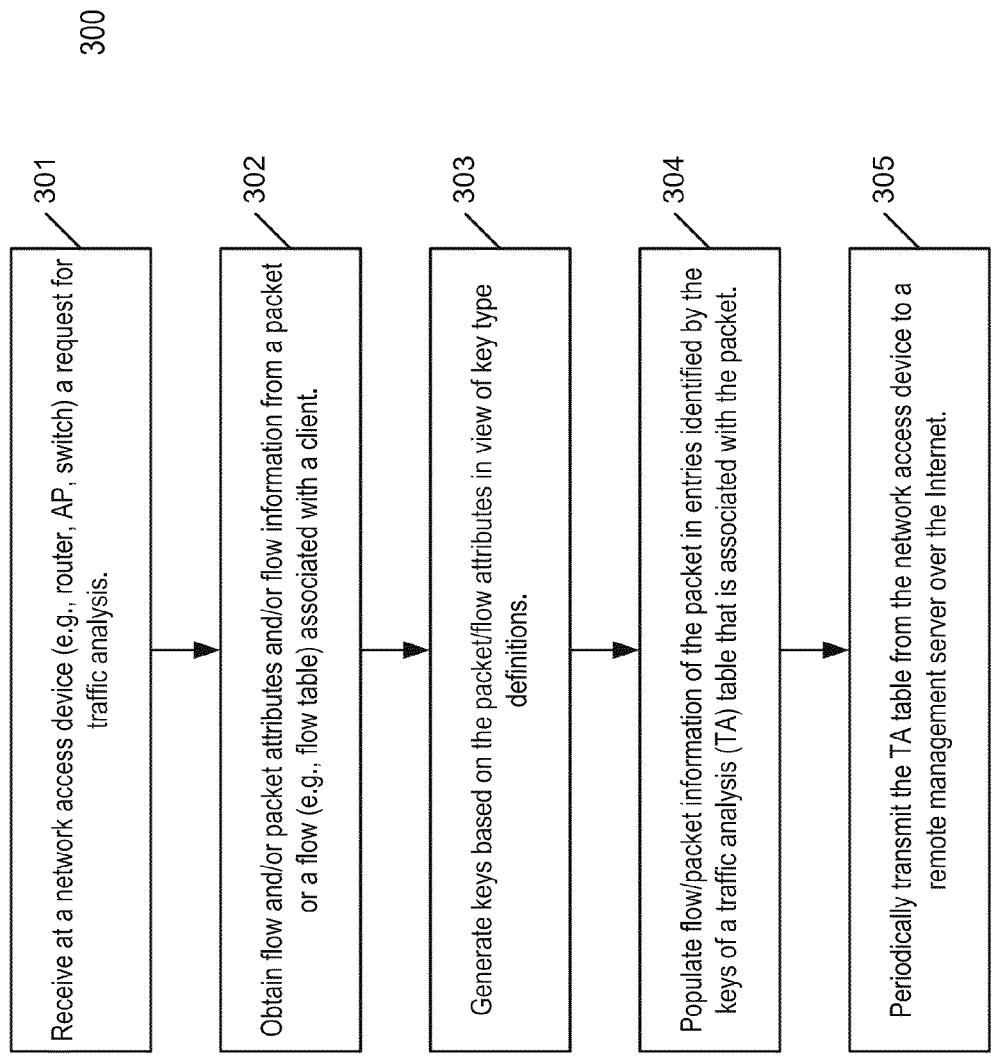
FIG. 3 is a flow diagram illustrating a method for traffic analysis according to one embodiment of the invention.

FIG. 3 is a flow diagram illustrating a method for traffic analysis according to one embodiment of the invention. Method 300 may be performed by network access device 200 of FIG. 2. Referring to FIG. 3, at block 301, a request for traffic analysis is received at the network access device. In response, the packet/flow attributes and/or packet/flow information from a packet or from a flow (e.g., flow table) associated with a LAN device. At block 303, one or more keys are generated based on the packet/flow attributes in view of key type definitions. Each of the keys represents a hierarchical level of a hierarchy in a corresponding TA table. At block 304, the packet/flow information is then populated in one or more entries identified by the keys of a TA table. At block 305, traffic data represented by the TA table is periodically transmitted from the network access device to a remote management server over the Internet.

FIG. 4 is a block diagram illustrating an example of key definition table according to one embodiment of the invention. Referring to FIG. 4, key definition table (also referred to as a key-type definition table or data structure) may be configured by an administrator via a Web interface of management server 101 and downloaded to a network access device. Key definition table may be stored in a persistent storage of a network access device and loaded into a memory when traffic analysis operations are performed by the network access device.

According to one embodiment, key definition table 203 includes multiple key entries, each key entry representing a key and storing information indicating how the key should be constructed. Specifically, each entry includes a first field to store a key type identifier (ID) 401 identifying that particular key type and one or more second fields to store zero or more packet/flow attributes 402 that can be individually selected and combined to construct the corresponding key. Examples of the packet/flow attributes 402 include hostname 403, port 404, and protocol 405. Other packet/flow attributes may also be utilized. Each of the second fields stores an indicator indicating whether the corresponding packet/flow attribute should be utilized (in combination with one or more other packet/flow attributes) to generate a key of the corresponding key type. According to one embodiment, each entry represents a hierarchical level of a hierarchy and key definition table 203 may include multiple hierarchies. Each hierarchical level includes all of the packet/attributes of its parent hierarchical level, plus at least one additional packet/flow attribute that is not present in its parent hierarchical level. Each hierarchical level excludes at least one packet/flow attribute from its child hierarchical level (if there is any).

For example, referring to FIG. 4, entry 410 represents a root entry of the entire global hierarchy of definition table 203. In this example, entry 410 represents a key that is generated that is not based on any of packet/flow attributes 402. As shown in FIG. 4, each of the second fields 403-405 of entry 410 includes an indicator 'E' to exclude the corresponding packet/flow attribute when generating the corresponding key. That is, in this example, the root key 410 represents an entry in a TA table to store any traffic (e.g., not limited to any hostname, port, or protocol).

In the example as shown in FIG. 4, entry 411 represents a child hierarchical level with respect to root level 410, where a key corresponding to entry 411 should be generated based on a hostname. In this example, field 403 of entry 411 stores an indicator 'I' to include the corresponding packet/flow attribute when generating the key. In this example, a key corresponding to entry 411 represents an entry in a TA table to store any traffic exchanged with a particular hostname (e.g., hostname centric traffic information). Entry 411 as a child hierarchical level includes all packet/flow attributes of its parent level entry 410, plus at least one packet/flow attribute that is not present in parent level entry 410 (e.g., hostname 403). In this particular example, since root entry 410 does not include any of packet/flow attributes 402, entry 411 as a child level includes only one packet/flow attribute 403.

Similarly, entry 412 is a child hierarchical level with respect to entry 411 while entry 413 is a child hierarchical level with respect to entry 412. Entry 412 includes all packet/flow attributes of its parent 411 (e.g., hostname 403), plus at least one additional packet/flow attribute that is not present in its parent 411 (e.g., port 404). Entry 412 excludes at least one packet/flow attribute from its child hierarchical level entry 413 (e.g., port 404). A key corresponding to entry 412 represents an entry in a TA table storing traffic data corresponding to a particular hostname and using a particular port. Similarly, a key corresponding to entry 413 represents an entry in a TA table storing traffic data corresponding to a particular hostname and using a particular port and a particular protocol. Entries 410 and 411-413 represent a sub-hierarchy while entries 410 and 414-415 represent another sub-hierarchy. Since the keys are constructed in a hierarchy, the entries in a TA table represented by the keys are also in a hierarchy.

Note that key definition table 203 has been described for the illustration purpose only; it can also be implemented in other formats of data structures. For example, key definition table 203 can be implemented as an array of data structures, where each data structure has multiple data members and each data member represents one of the selected packet/flow attribute. Alternatively, key definition table 203 may be implemented as an array of bitmaps, where each bit of a bitmap having a predetermined logical value (e.g., TRUE), in combination of its location in the bitmap, represents one of the packet/flow attribute. The bitmap represents a combination of the packet/flow attributes which are represented by the corresponding bits.

FIG. 5 is a block diagram illustrating a traffic analysis table according to one embodiment of the invention. Referring to FIG. 5, TA table 113 corresponds to a particular LAN device of a network access device. TA table 113 includes multiple entries which are created to store traffic data of the LAN device. Each of the entry is created based on a key that is created based on key definition table 203 as shown in FIG. 3. Each entry includes a first field 501 to store a key ID, a second field to store traffic measure weighted in favor of recent traffic, also referred to as recent traffic measure, and one or more third fields to store various traffic statistic parameters 503.

In one embodiment, key ID 501 is generated based on one of the key definitions from key definition table 203. A key ID can be a combination of one or more attribute identifiers identifying one or more packet/flow attributes. Alternatively, a key ID can be implemented as a tuple having one or more members storing the actual packet/flow attributes. Further, a key ID may be a hash value generated by hashing one or more attribute identifiers or one or more actual packet/flow attributes. Recent traffic measure 502 represents recent traffic a LAN device associated with the TA table 113. In one embodiment, recent traffic measure 502 is used to determine whether a particular type of traffic (e.g., traffic associated with a specific hostname or Web site, a particular port, and/or a particular protocol) has frequently occurred with respect to the associated LAN device. Another word, recent traffic measure 502 is used to determine which entry or entries representing less frequent traffic can be removed from TA table 113 during an entry eviction process, which will be described in details further below.

In one embodiment, a variety of traffic statistic parameters 503 can be captured and recorded in the third fields, including RX traffic count 504 and TX traffic count 505, as well as other packet/flow traffic data (e.g., duration that the LAN device stays within the same Web site, a number of flows, and a number HTTP requests initiated by the LAN device, etc.). RX traffic count 504 and TX traffic count 505 may store a number representing an amount of traffic (e.g., in bytes, megabytes or MB) received and transmitted by the corresponding LAN device.

According to one embodiment, referring to FIGS. 2 and 4-5, when packet/flow information is received, either from a packet inspector 110 inspecting a packet just intercepted by packet inspector 110 or from flow table 114 maintained by the network access device, one or more keys are generated by key generator 204 based on the packet/flow information according to a set of key definitions 203. These could be a combination of any of hostname, port, and protocol, dependent upon the key definitions 203. When generating a key, the key generator may examine all packet/flow information provided by packet inspector 110, including source and destination IP addresses, source and destination ports, etc. If a key definition indicates that a key should be generated based on a port, according to one embodiment, a source port or a destination port may be used to generate the key. In a particular embodiment, a smaller one of the source port number and the destination port number is selected for key generation. Usually, a smaller port number is less likely to be a randomly generated port number. In general, port numbers that correspond to actual services tend to have low port numbers, and clients tend to randomly generate high port numbers. Thus, the lower of the two port numbers is often more interesting to track.

For each of the keys generated, entries of TA table 113 are searched by TA table manager 206 to locate those whose keys 501 match the keys generated based on the packet/flow information. If the matching entries of TA table 113 are found, the recent traffic measure 502 and traffic statistic parameters 503 are updated based on the packet/flow information. If no matching entry is found, a new entry is created if there is enough space in TA table 113. Otherwise, an entry eviction process is performed to evict an entry to make room for a new entry.

Since a network access device may support a larger number of LAN devices, a larger number of TA tables may be maintained by the network access device. According to one embodiment, each of the TA tables is maintained with a limited number of entries (e.g., 50 entries) in order to limit the memory or storage space required to store such TA tables. However, a LAN device may access a number of different Web sites each being identified by a hostname or Web address. According to one embodiment, a TA table is configured to only store recent frequent traffic information using an efficient housekeeping routine or table entry eviction process, which will be described in details further below.

For the purpose of illustration, it is assumed that the packet/flow information is associated with packets of a flow exchanged between a LAN device and a Web site google.com using port 80 and TCP/IP protocol. Such information may be dynamically obtained by packet inspector 110 from the packets or other traffic information. Based on this information key generator 204 examines key definitions 203 (serving as key generation rules) to determine what kinds of keys should be generated. In the example as shown in FIG. 4, key definitions 203 indicate that keys based on entries 410-416 should be generated. As a result, keys corresponding to root key 410 is generated which is not based on any packet/flow attributes. In addition, keys corresponding google.com, TCP/IP protocol identifier, and port 80 are generated and entries in TA table 113 are populated.

In this embodiment, key definitions 203 define the key types (e.g., hostname, port, protocol), while the actual keys are generated based on the specific information based on the real-time traffic. For example, TCP/IP protocol is one type of protocol while UDP/IP is another type of protocol. In this way, an administrator can specify to track traffic based on protocol regardless what protocols are used in the real-time traffic. As a result, based on the key definitions 203, a first key corresponding to the TCP/IP protocol is generated in response to a TCP/IP packet and a second key corresponding to the UDP protocol is generated in response to a UDP packet. Entries corresponding to both TC/IP and UDP protocols will be populated in TA table 113.

A conventional system would require the administrator to specifically and statically specify both TCP/IP and UDP protocols to be tracked. This is particularly useful for tracking any hostname (e.g., a category or key type of hostname). For example, an administrator can configure key definitions 203 to generate a key based on a hostname. In response, key generator 204 will generator a key for any hostname for the packets, such as google.com, youtube.com, etc. A conventional system would require specifically listing both google.com and youtube.com. If a LAN device accesses a new Web site "abcdefg.com" that just appears on the Internet recently, the conventional system would not be able to track the traffic since the new Web site "abcdefg.com" is unknown and has not been configured by an administrator. The traffic data would have been categorized as unknown or miscellaneous traffic. In contrast, according to one embodiment, key generator 204 can determine that a key corresponding to a hostname should be generated based on key definitions 203. Key generator 204 then dynamically determines or discovers the hostname for the new Web site, in this example, "abcdefg.com" and generates a new key based on "abcdefg.com." The traffic data can then be populated in TA table 113.

Figure 9A:
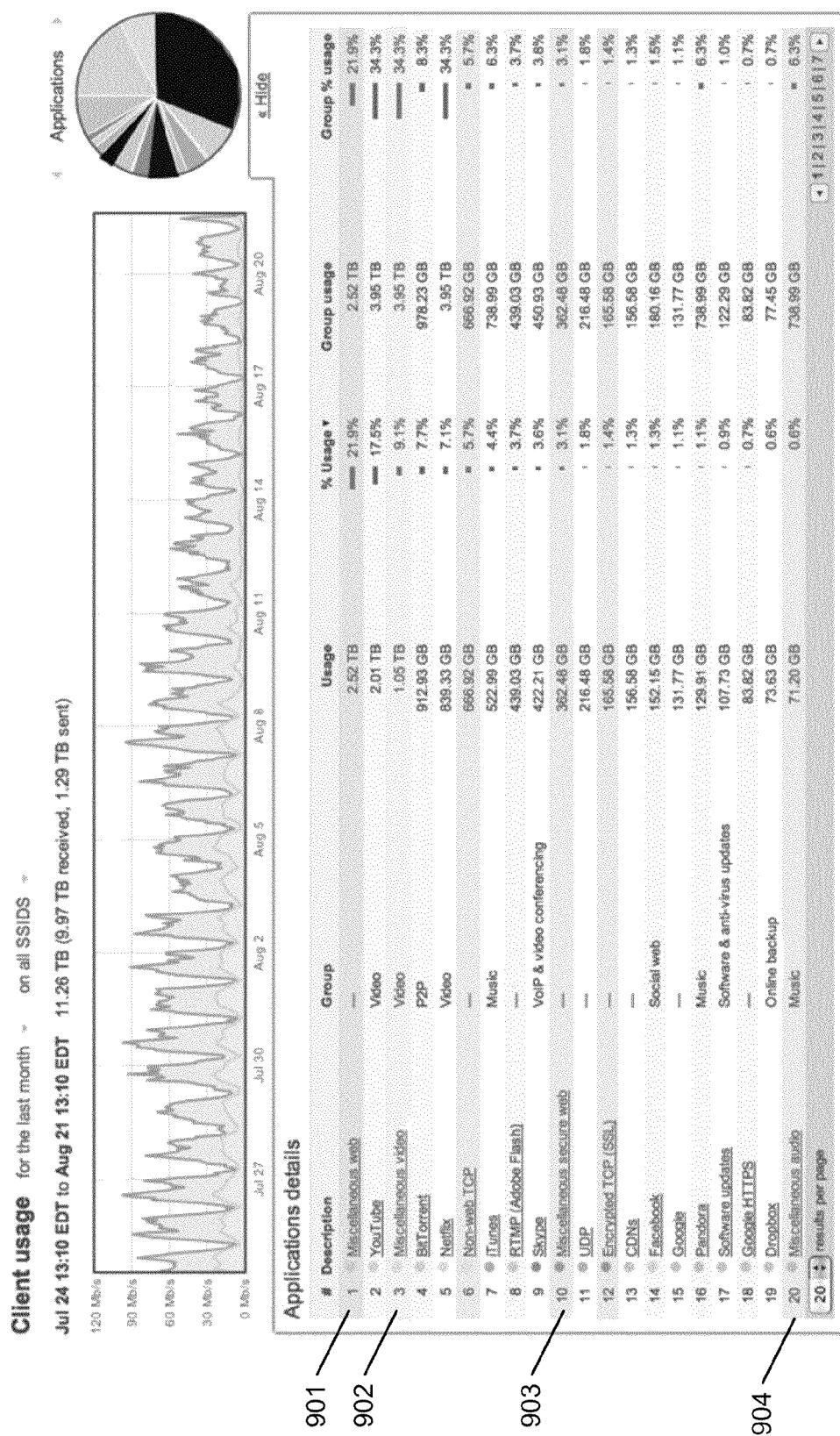
Figure 9B:
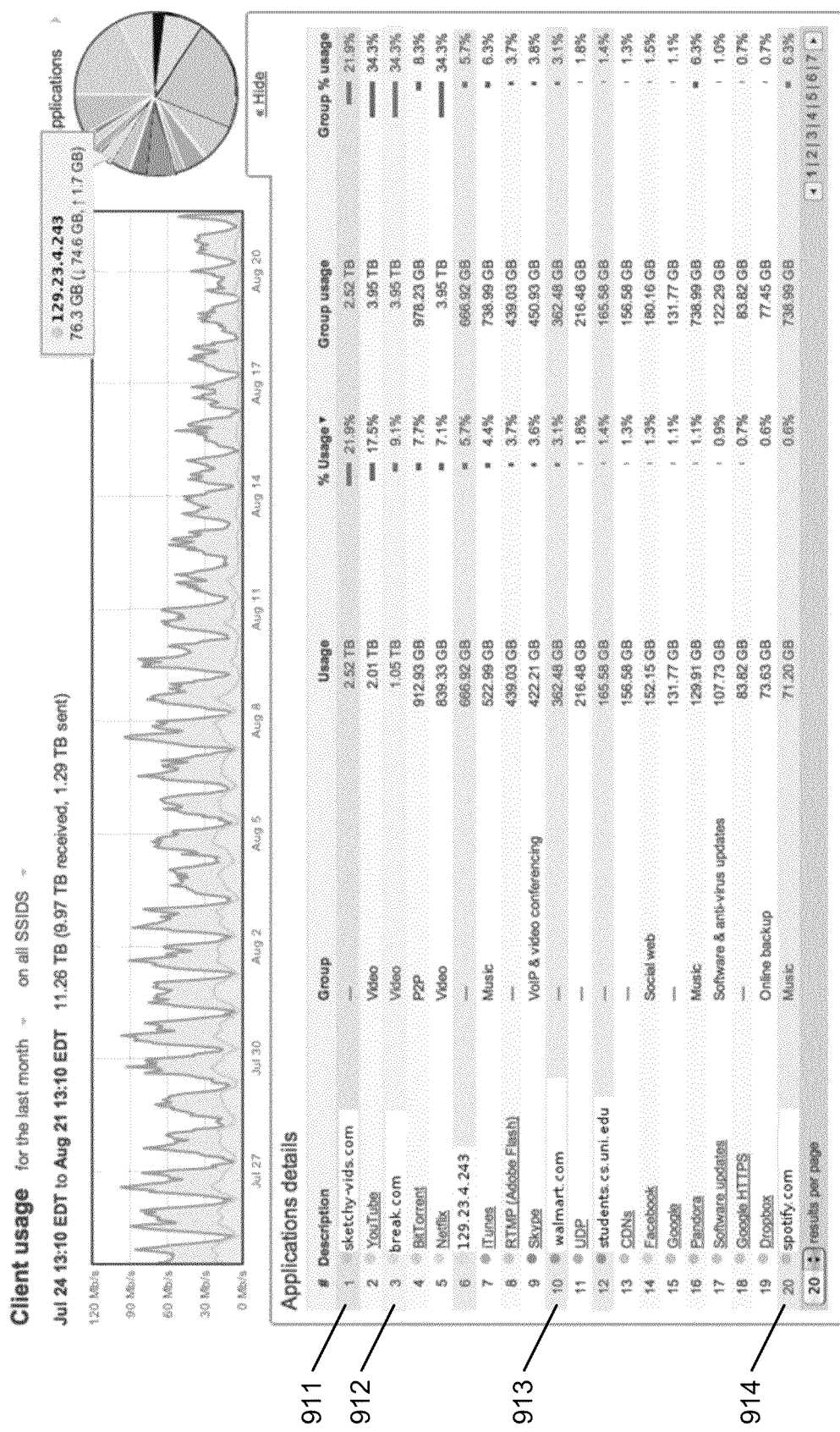
Figure 9C:
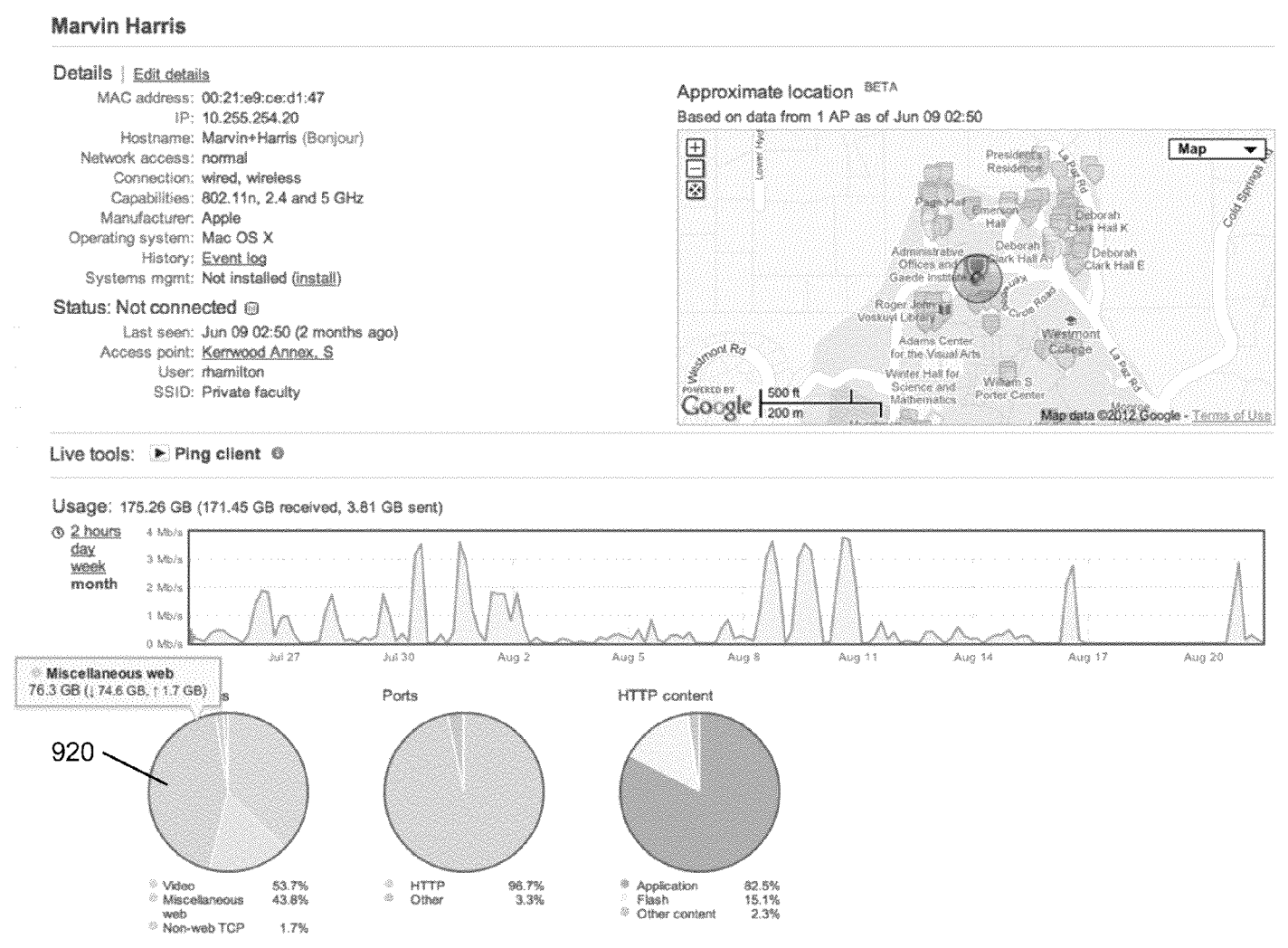
Figure 9D:
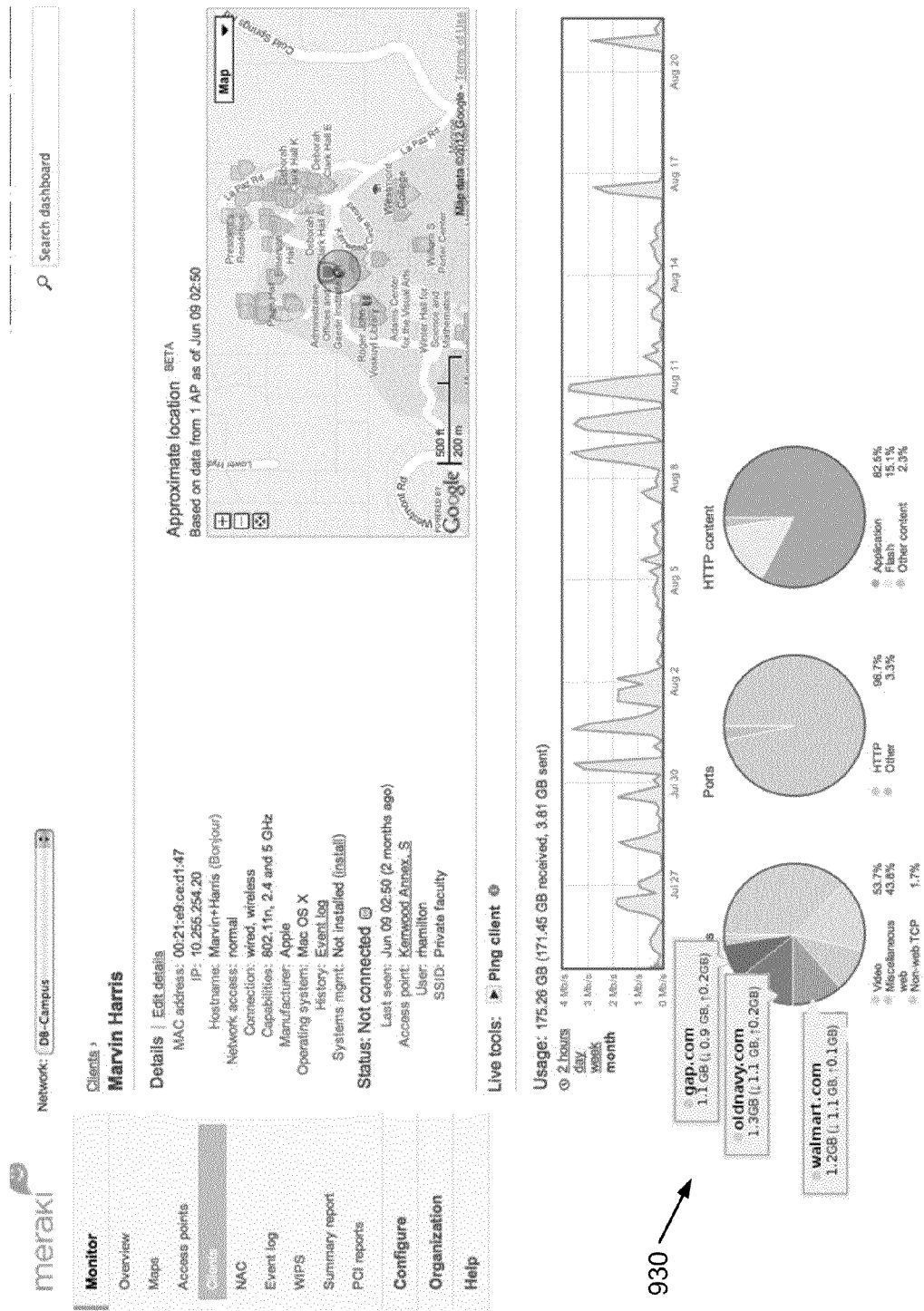
Figure 9E:
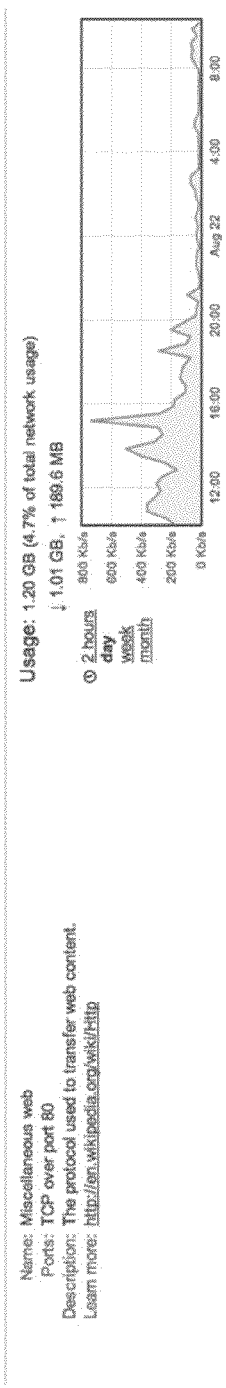
Figure 9F:
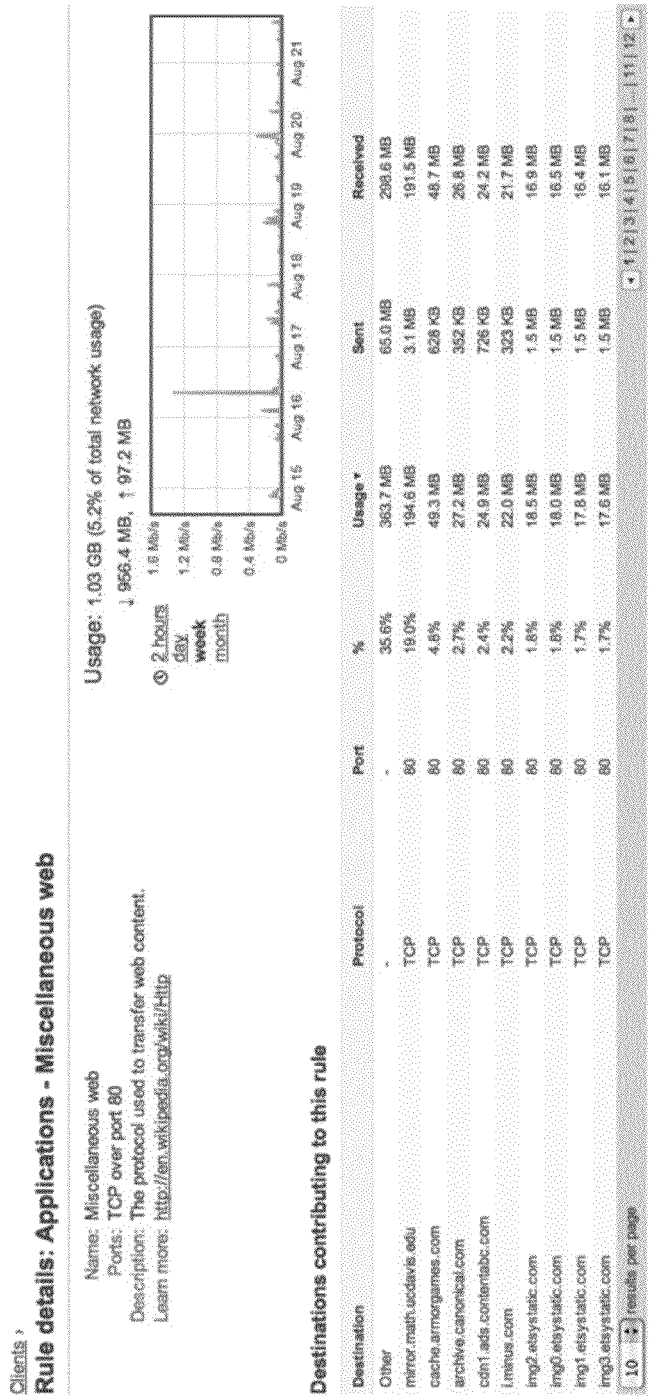

FIGS. 9A-9F are screenshots illustrating examples of graphical user interfaces (GUIs) presented by a conventional system and by a management server according to certain embodiments of the invention. Referring to FIG. 9A, which represents a GUI by a conventional system, since the system statically defines what (e.g., specific hostname such as google.com) should be tracked, for any Web site that has not been specifically defined, the traffic data can only be shown as miscellaneous traffic as shown in entries 901-904. With dynamic features of embodiments of the invention as described above, corresponding traffic data can be shown with correct hostnames (which is automatically discovered as described above) as entries 911-914 shown in FIG. 9B. Similarly, the unrecognized miscellaneous traffic data can only be shown as a big unknown pie chart as shown pie chart 920 of FIG. 9C, as well as vague traffic data as shown in FIG. 9E, in a conventional system, while embodiments of the invention can show more detailed of the same traffic data as part of pie chart 930 of FIG. 9D, as well as more detailed or fine grain traffic data as shown in FIG. 9F.

Referring back to FIGS. 2 and 4-5, according to one embodiment, a discovery module of a network access device is configured to automatically discover a hostname based on the traffic flow of a LAN device. The discovery module may examine a domain name system (DNS) request initiated from a LAN device when the LAN device attempts to access an external Web site. If such an attempt fails, the discovery module may try to extract the hostname from a HTTP request. Alternatively, the discovery module may determine the hostname from a secure socket layer (SSL) certificate. Other methods may also be utilized. Such a dynamic determination of certain packet/flow attributes, such as hostnames, is very useful for any new Web site occurs in every possible day. Embodiments of the invention can dynamically capture such dynamic information and the traffic information can be shown with respect to the dynamically determined packet/flow attributes by the management server, instead of showing traffic data for an unknown Web site. Further, the hierarchical structure of traffic data as shown in FIG. 5 allows more fine grain details on different levels of traffic statistics. That gives a user or an administrator more flexibility of performing a traffic analysis for different purposes. A user can drill down to different levels of details of traffic statistics based on different categories (e.g., based on different hostname, port, or protocol, etc.).

Referring back to FIG. 5, for all of the entries that match the keys generated from the packet/flow information, the traffic RX count 504 or TX count 505 for the matching entries are incremented by an amount of traffic carried by the packet or specified in the packet/flow information. For example, if the packet/flow information indicates that packets are received by the LAN device, RX count 504 is incremented, in this example, in MBs; otherwise, TX count 505 is incremented. In addition, recent traffic measure 502 is also incremented by the same amount. For example, if a new packet carries 10 MB, in the example as shown in FIG. 5, recent traffic measure 502 of root entry 510 will be incremented by 10 MB to reach 110 MB. If the new packet is received by the LAN device, RX count 504 of entry 510 will be incremented by 10 MB to reach 90 MB. If the new packet is a TCP/IP packet, both recent traffic measure 502 and RX count 504 of entry 511 will be incremented by 10 MB. If the new packet is targeted at google.com, fields 502 and 504 will be incremented by 10 MB for entry 512. If the new packet is a TCP/IP packet via port 443, same update is performed on entry 514. Thus, the same packet/flow information may be updated in multiple entries in TA table 113 representing different hierarchical levels dependent upon the corresponding key definitions.

For a key generated from the packet/flow information that does not have a matched entry, according to one embodiment, a new entry is created if there is room for a new entry in TA table 113. The traffic information is then populated in the new entry including incrementing RX count 504 or TX count 505 dependent upon the traffic direction, as well as incrementing recent traffic measure 502 by the same amount. Initially, when a new entry is populated, recent traffic measure 502 represents a sum of both RX count 504 and TX count 505. If there is no space in TA table 113 for a new entry, according to one embodiment, recent traffic measure 502 of all entries will be decremented by an amount of traffic specified by the packet/flow information. Using the above example, recent traffic measure 502 of all entries will be decremented by 10 MB. However, RX count 504 and TX count 505 remain untouched; they still represent the overall traffic information. After the recent traffic measure reduction, according to one embodiment, any entry whose recent traffic measure is below a predetermined threshold (e.g., zero) may be removed from TA table 113 to make room for a new entry.

In addition, a housekeeping routine is independently performed on TA table 113 periodically, for example, every 10 minutes. According to one embodiment, recent traffic measure 502 of all entries is periodically scaled down by a predetermined factor. In one particular embodiment, the recent traffic measure is divided by a factor of two. Over time, if there is no new traffic to be accumulated to an entry, the recent traffic measure of that entry will be scaled down to a very small value and eventually is removed from TA table during an eviction process. By periodically scaling down the recent traffic measure 502, it represents a recent traffic average movement. The recent traffic measure 502 is solely used determine which of the entries has less recent traffic and becomes an eviction candidate. When traffic statistics is reported to the management server, only the traffic statistic parameters 503 are transmitted to the management server without reporting recent traffic measure 502.

The traffic statistics may be reported using a UDP/IP packet via a communication channel with the management server. The traffic statistics may be carried by a UDP packet having an internal IP address of the network access device that is exclusively used between the network access device and the management server for the sole purpose of exchange management message. The UDP packet is then encapsulated within an IP packet having an external IP address (which may be a public IP address if the network access device is directly coupled to the Internet) of the network access device as a source IP address. The IP packet is then transmitted to the management server in an ordinary manner, for example, using TCP/IP protocol.

In order to keep the management traffic at a reasonable level between a network access device and the management server, only the statistic data of certain entries that meet certain conditions or criteria will be reported to the management server. In one embodiment, a network access device only reports the traffic statistics of entries whose recent traffic measures are greater than a predetermined threshold. Typically, a user may be more interested in the recent traffic than those occurred a while ago. Alternatively, a network access device only reports the traffic statistics of entries whose RX/TX counts are greater than a predetermined threshold. Furthermore, a network access device may only populate the traffic data in the entries whose recent traffic measures are greater than a predetermined threshold.

Figure 6:
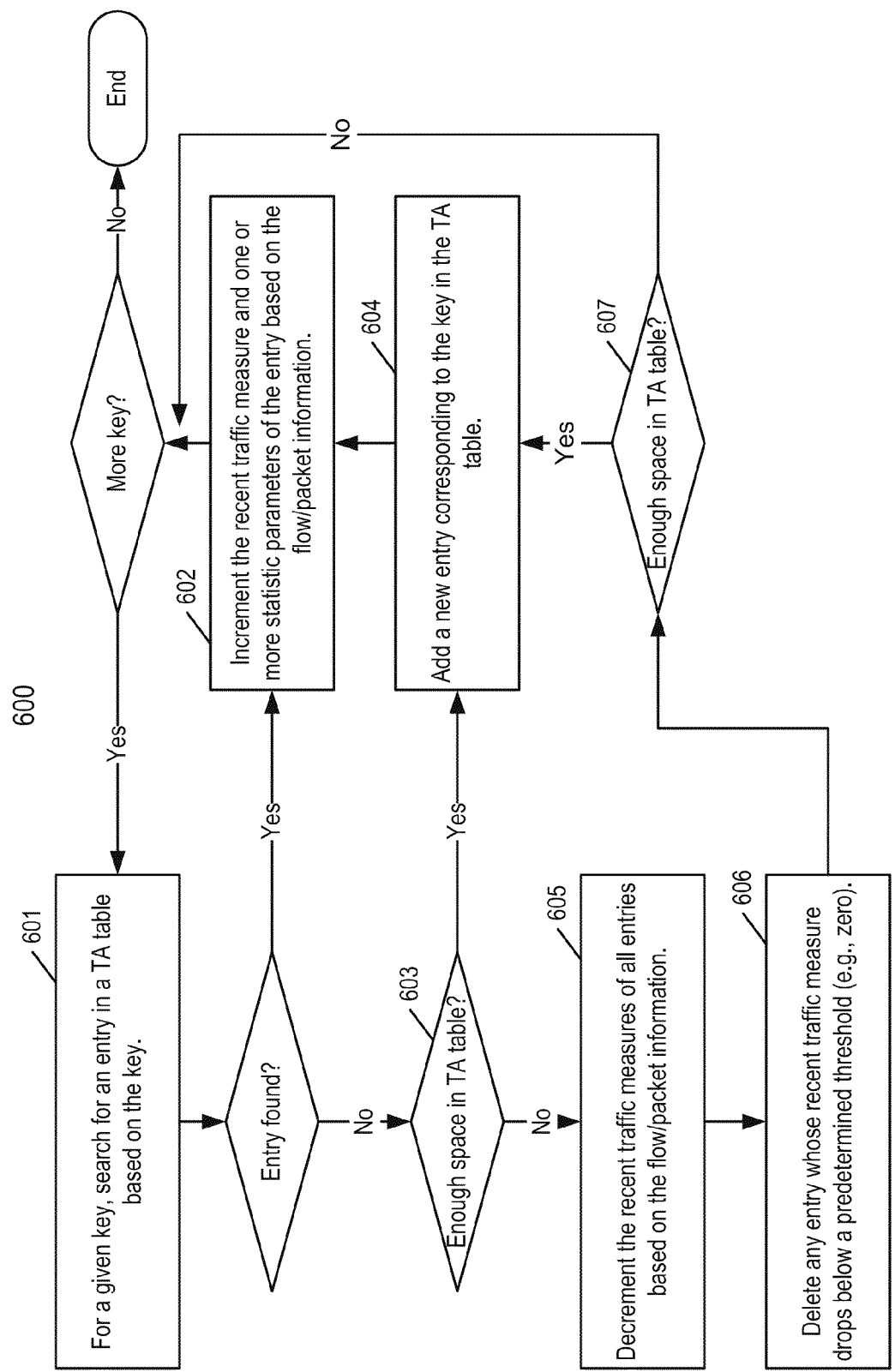
FIG. 6 is a flow diagram illustrating a method for populating a traffic analysis table according to one embodiment of the invention.

FIG. 6 is a flow diagram illustrating a method for populating a traffic analysis table according to one embodiment of the invention. Method 600 may be performed by a network access device. For example, method 600 may be performed as part of operations involved in block 304 of FIG. 3. Referring to FIG. 6, at block 601, for a given key, processing logic searches an entry in a TA table that matches the key. The key may be generated based on packet/flow information obtained from a packet or a flow table in view of key definitions. If a matching entry is found, at block 602, the traffic data is populated in the entry, for example, incrementing the recent traffic measure, RX/TX counts, etc. If no matching entry is found, at block 603, processing logic determines whether there is enough space in the TA table. If so, at block 604, a new entry is created and the traffic data is populated at block 602. If there is not enough space in the TA table for a new entry, at block 605, the recent traffic measure of all entries are decremented based on the packet/flow information. At block 606, if there is any entry whose recent traffic measure drops below a predetermined threshold after the recent traffic reduction, such an entry may be removed from the TA table to make room for a new entry. The operations of method 600 may be repeatedly performed for each of the keys generated.

Figure 7:
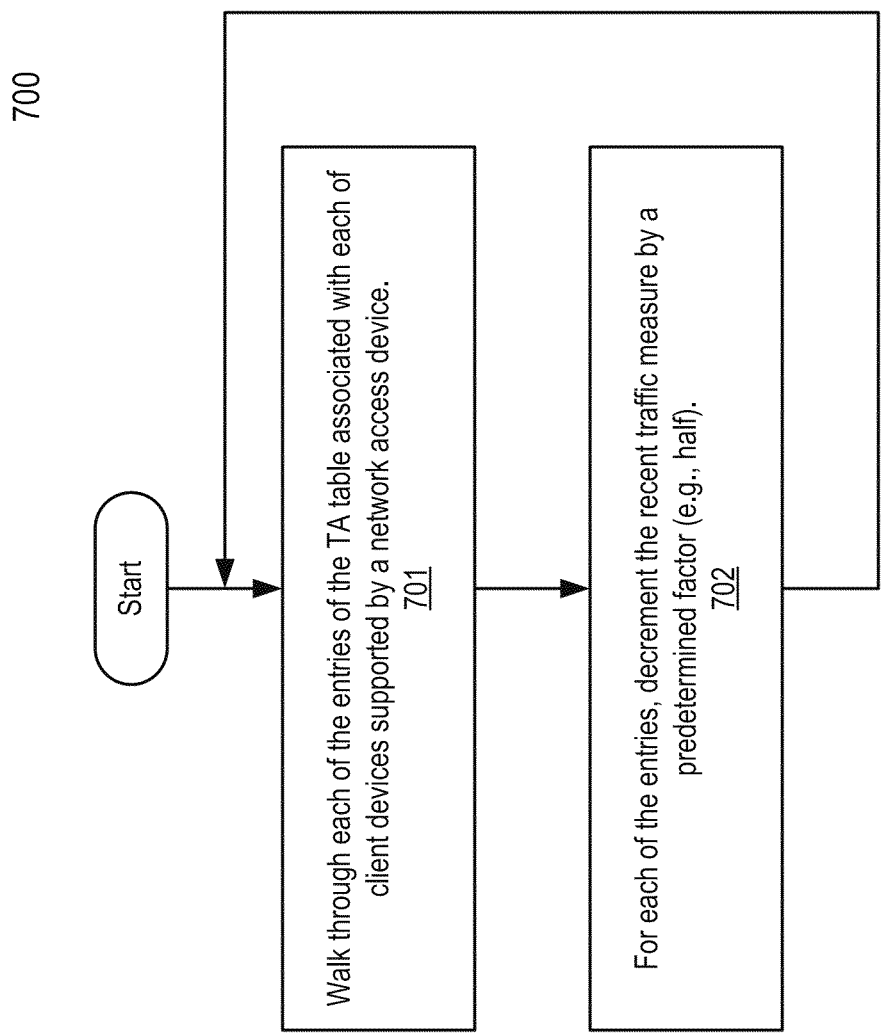
FIG. 7 is a flow diagram illustrating a method of traffic analysis table housekeeping process according to one embodiment of the invention.

FIG. 7 is a flow diagram illustrating a method of traffic analysis table housekeeping process according to one embodiment of the invention. Method 700 may be performed periodically and/or independently with respect to method 600 of FIG. 6, for example, every 20 minutes via a separate thread of a network access device. Referring to FIG. 7, at block 701, processing logic walks through each of the entries in each of the TA tables maintained by the network access device. At block 702, for each of the entries of each TA table, processing logic scales down the recent traffic measure by a predetermined factor, such as, for example, by dividing the recent traffic measure by a factor of two.

FIG. 8 is a flow diagram illustrating a method performed by a management server according to one embodiment of the invention. Method 800 may be performed by management server 101 of FIG. 1. Referring to FIG. 8, at block 801, processing logic periodically receives traffic statistic data of TA tables from network access devices. At block 802, the traffic statistic data is incorporated into an aggregated TA table maintained by the management server. Subsequently at block 803, a request is received for traffic analysis of a particular category, which may be defined as part of category definitions 119 of management server 101. At block 804, entries of the aggregated TA table that are associated with the requested category are identified based on the category definitions. At block 805, a graphical chart representing the traffic statistics is displayed.

Figure 10A:
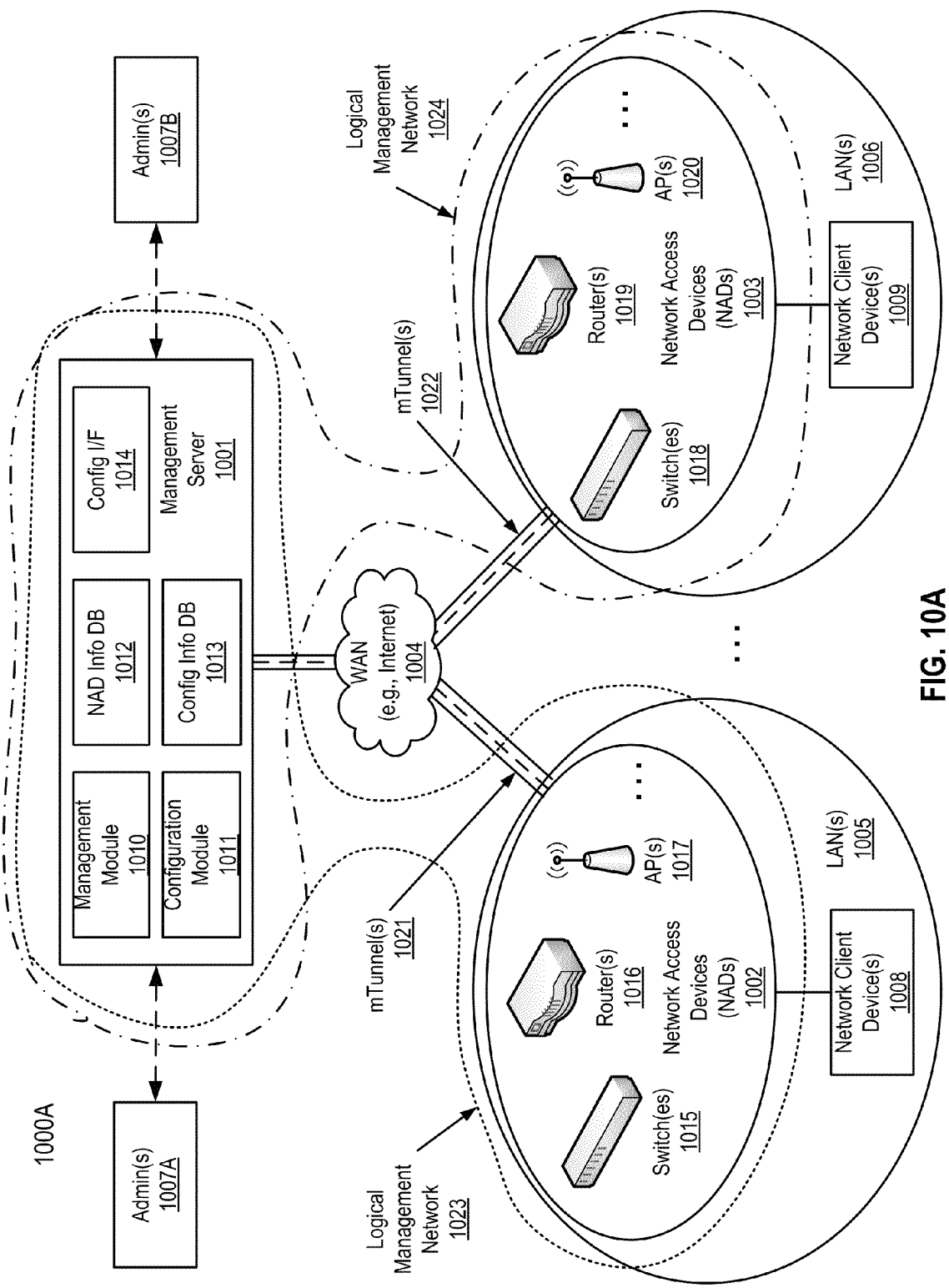
FIGS. 10A and 10B are block diagrams illustrating a cloud managed network configuration according to some embodiments of the invention.

FIG. 10A is a block diagram illustrating a cloud managed network system according to one embodiment of the invention. System 1000A may be implemented as part of any of the network systems described above, such as system 100 of FIG. 1. Referring to FIG. 10A, system 1000A includes, but is not limited to, various network access devices (NADs) 1002-1003 managed by a management server 1001 over WAN 1004. Management server 1001 may be a Web or cloud server, or a cluster of servers, running on server hardware. Each of network access devices 1002-1003 may be associated with a LAN such as LANs 1005-1006. A LAN herein may also refer to a sub-network or network segment (e.g., subnet or a virtual LAN (VLAN)) of a larger LAN (e.g., Intranet). Network 1004 may be the Internet. Any of network access devices 1002-1003 may operate as a gateway device (e.g., routers 1016 and 1019), an access point (AP) (e.g., APs 1017 and 1020), a network switch (e.g., switches 1015 and 1018), or a combination thereof to LANs 105-106, wired or wireless, where various network client devices (NCDs) 1008-1009, also referred to as LAN devices, can be communicatively coupled to LANs 105-106.

According to one embodiment, a network access device may represent a gateway device interfacing a LAN to WAN 1004 and performs network address translation (NAT) for its clients, which may be client devices 1008-1009 or other network access devices. A network access device may be configured behind another network access device. For example, an uplink of an access point may be coupled to a downlink of a gateway device. Alternatively, an uplink of a network switch may be coupled to a downlink of a gateway device or an access point, etc. A network access device may be an integrated device integrating two or more of these functionalities (e.g., router/gateway, access point, and/or network switch), wired and/or wireless.

Referring back to FIG. 10A, in one embodiment, management server 1001 works for both single and multi-tenant installations, meaning that multiple organizations (e.g., corporate clients) with different network administrators may have network access devices managed by the same management server, and network configuration or management can be performed using the same management server, but that are firewalled off from each other and do not have access to each other's network configurations. In this example, network access devices 1002 and network access devices 1003 may be associated with or owned by the different organizations and administrated by different network administrators 1007A and 1007B associated with the organizations. Some of network access devices 1002 may communicate with each other to form a local mesh network, while some of network access devices 1003 may communicate with each other to form another local mesh network.

According to one embodiment, management server 1001 includes a management module 1010 and a configuration module 1011 to manage and to configure network access devices 1002-1003 and to generate management server configuration information for each of network access devices 1002-1003, which may be stored in configuration information database 1013. In one embodiment, management server 1001 provides a user interface 1014 such as a Web interface to allow a network administrator such as administrators 1007A and 1007B to create and log into an account associated with an organization to which the network access devices 1002 or network access devices 1003 belong.

The management server 1001 further includes a NAD information database 1012, including information regarding the network access devices 1002-1003. In one embodiment, the NAD information database 1012 includes a serial number and a mechanism to authenticate the network access device's identity (e.g., the public key of a private public key pair, the private key of which was embedded or stored in the network access device during the manufacturing). NAD information database 1012 may be populated different ways in different embodiments (e.g., populated by the seller of the network access devices, populated by the network administrator). In embodiments in which this information is populated by the seller, different ones of these embodiments may associate the information regarding network access devices 1002-1003 in the router information database with the user account in different ways (example, network administrators 1007A and 1007B may provide an order number (or invoice number) associated with a purchase of network access devices 1002 or 1003).

According to one embodiment, when a network access device is powered up and attempts entering network 1004, the network access device attempts to contact management server 1001. In one embodiment, certain device information such as an IP address and domain name service (DNS) name of management server 1001 is stored in the network access device when it is manufactured. In one embodiment, when the network access device is powered up, the network access device performs any self configuration processes including obtaining an IP address for itself from a dynamic host configuration protocol (DHCP) facility (which address may be a public IP address, or may be a private IP address if there is a device performing NAT between the router and the WAN (that is to say, the network access device is behind a device performing NAT)). The network access device then accesses management server 1001 based on the server's IP address and authenticates itself (e.g., signing a message (e.g., including the serial number of the network access device) using a private key associated (and/or stored) with the network access device, such that management server 1001 can authenticate the network access device using the associated public key (stored in NAD information database 1012) maintained by management server 1001).

In one embodiment, each of network access devices 102-103 creates one or more secure communication channels (e.g., a control tunnel) with server 1001 using the keys downloaded from management server 101 to exchange control traffic such as management messages or notification, operating statuses of the network access device, etc. Such a tunnel for network management purposes is referred to herein as an mTunnel. In this example, network access devices 1002 maintain at least one mTunnel 1021 with management server 1001 and network access devices 1003 maintain at least one mTunnel 1022 with management server 1001. In one embodiment, each of network access devices 1002 may maintain a persistent mTunnel with management server 1001. Alternatively, only the network access device operating as a gateway device maintains an mTunnel with management server 1001, while other network access devices behind the gateway device communicate with the gateway device to share the same mTunnel. In one embodiment, a network access device operating as a gateway performs network address translation (NAT) for its clients, which may be a network client device or another network access device.

In one embodiment, once a network access device has been successfully authenticated by server 1001, the network access device downloads configuration information and stores it in a storage device within the network access device. This download may take place over a secure session layer (SSL)-encrypted session and/or the management server may encrypt the data using the public key corresponding to the private key. This secure channel may also be used to receive subsequent configuration updates from management server 1001. According to one embodiment, subsequently, when there is a change in the configuration, such as adding or removing a network access device, changing of subnet settings (for example, by an administrator such as administrators 1007A and 1007B via a Web interface of management server 1001), management server 1001 is to generate updated configuration information and communicate the updates to the network access devices via their corresponding mTunnels (such communication can be done with different mechanisms depending on the embodiment of type of information, including a push mechanism, a pull mechanism, etc.).

A variety of tunneling protocols can be utilized over an mTunnel between a network access device and management server 1001, such as, for example, Internet protocol (IP) over user datagram protocol (UDP) (IP/UDP) encapsulation. UDP is one of the core members of the Internet Protocol Suite, the set of network protocols used for the Internet. With UDP, computer applications can send messages, in this case referred to as datagrams, to other hosts on an IP protocol network without requiring prior communications to set up special transmission channels or data paths. UDP uses a simple transmission model without handshaking dialogues for providing reliability, ordering, or data integrity. Thus, UDP provides an unreliable service and datagrams may arrive out of order, appear duplicated, or go missing without notice. UDP assumes that error checking and correction is either not necessary or performed in the application, avoiding the overhead of such processing at the network interface level. Time-sensitive applications often use UDP because dropping packets is preferable to waiting for delayed packets, which may not be an option in a real-time system. If error correction facilities are needed at the network interface level, an application may use the Transmission Control Protocol (TCP), which is designed for this purpose. UDP applications use datagram sockets to establish host-to-host communications. An application binds a UDP socket to its endpoint of data transmission, which is a combination of an IP address and a UDP port.

For example, a network management message may be carried as an IP packet and the IP packet may be encapsulated within a UDP packet exchanged between a network access device and management server 1001 over a respective mTunnel. In one embodiment, an IP packet having one or more network management messages embedded therein may be wrapped with a predetermined mTunnel header and is transmitted within a UDP packet between management server 1001 and a network access device, even if the network access device is behind a NAT device.

In some configurations, if a network access device is behind a firewall that does not allow any UDP packet going through, a UDP packet carrying a network management message may be encapsulated within a hypertext transport protocol (HTTP), referred to herein as UDP over HTTP (UDP/HTTP). Since most of the firewalls allow Internet traffic using HTTP protocol with a transport control protocol (TCP) port of 80, it is likely a UDP packet embedded within an HTTP packet having a destination TCP port of 80 or port 443 can reach management server 1001. In such a configuration, when management server 1001 receives the HTTP packet, it may remove any HTTP header to reveal a UDP packet encapsulated therein. Thereafter, an IP packet encapsulated within the UDP packet may be extracted and the network management message within the IP packet can be obtained.

According to one embodiment, management server 1001 and network access devices associated with an organization such as network access devices 1002 may utilize an internal set of IP addresses (also referred to as mTunnel or management IP addresses) to exchange network management messages via the respective mTunnel or mTunnels. That is, the internal IP addresses used by management server 1001 and network access devices 1002 via the respective mTunnel or mTunnels may be in a separate IP address space (e.g., 6.x.x.x) that is different from an IP address space used between network access devices 1002 and their network client devices 1008 over LAN(s) 1005 (e.g., 10.x.x.x). The internal IP addresses described herein are only used between management server 1001 and network access devices 1002 to exchange network management messages over the respective mTunnel(s). In one embodiment, for a network access device that performs NAT for its LAN devices, it may have at least three IP addresses: 1) an uplink IP address for regular network traffic to an external network (e.g., external IP address used in the external network, or a public IP address if the uplink interface of the network access device is directly coupled to the Internet; 2) a downlink IP address (e.g., a private IP address used between the network access device and its LAN devices); and 3) an internal IP address (e.g., a management IP address or mTunnel IP address) solely used between a management server and the network access device via an mTunnel over the Internet for the purpose of exchanging network management messages. In this example, management server 1001 and network access devices 1002 using the internal IP addresses to exchange network management messages over mTunnel(s) 1021 forms a logical network 1023 (e.g., a logical management network).

Similarly, management server 1001 and network access devices 1003 of another organization in this example may utilize a different set of internal IP addresses to exchange network management messages through the respective mTunnel or mTunnels, where the internal IP addresses may be in a different IP address space than the one of IP addresses used between network access devices 1003 and their client devices 1009. Similarly, in this example, management server 1001 and network access devices 1003 using internal IP addresses to exchange network management messages over mTunnel(s) 1022 forms a logical network 1024 (e.g., a logical management network). The internal IP addresses (referred to herein as a first set of internal IP addresses) used between management server 1001 and network access devices 1002 may be different than the internal IP addresses (referred to herein as a second set of internal IP addresses). The first and second sets of internal IP addresses may be in different IP address spaces or in the same IP address space dependent upon the specific configuration.

According to one embodiment, when a network access device is powered up and initialized, the network access device performs certain self-configuration operations to determine whether the network access device should operate as a gateway or as an access point behind a gateway. In one embodiment, when a network access device boots up, it initializes its Ethernet interface and attempts to request an IP address (e.g., a publicly accessible IP address over the Internet, also referred to as an uplink IP address) by broadcasting its media access control (MAC) address within a dynamic host configuration protocol (DHCP) request via its Ethernet interface. If the Ethernet interface of this network access device is connected to the Internet, a DHCP server, which may be a separate server or part of management server 1001, will respond with a valid IP address assignment, and the network access device will operates as a gateway device. If there is no DHCP response received within a predetermined period of time, the network access device assumes that it is operating behind another gateway device that performs NAT, and the network access device then joins an existing network and operates as an access point.

According to one embodiment, when operating behind a gateway, each of the network access devices derives its own IP address and assigns IP addresses to its client devices using a predetermined method in a consistent manner. In one embodiment, a network access device performs a hash operation on at least a portion of its hardware identifier such as a MAC address to generate an IP address. In a particular embodiment, a network access device hashes its 6-byte MAC address using a predetermined hash function (e.g., CRC-32 hash function) to generate lower three bytes of its IP address. Note that each of the network access devices may generate two IP addresses for itself: 1) an internal IP address in a first IP address space (e.g., 6.x.x.x) solely for communicating network management messages with management server 1001 via an mTunnel; and 2) a private IP address in a second IP address space (e.g., 10.x.x.x) for normal network traffic with its client devices.

Similarly, when a network client device, such as client devices 1008, requests an IP address, the associated network access device hashes a MAC address of the client device to derive an IP address for the client device. Since each of the network access devices performs the same hash operation using the same hash function on a MAC address of a client device, the client device can consistently obtain the same IP address from different network access devices. As result, the client device can roam across different network access devices without having to change its IP address or to perform any address resolution protocol (ARP) related operations.

Figure 10B:
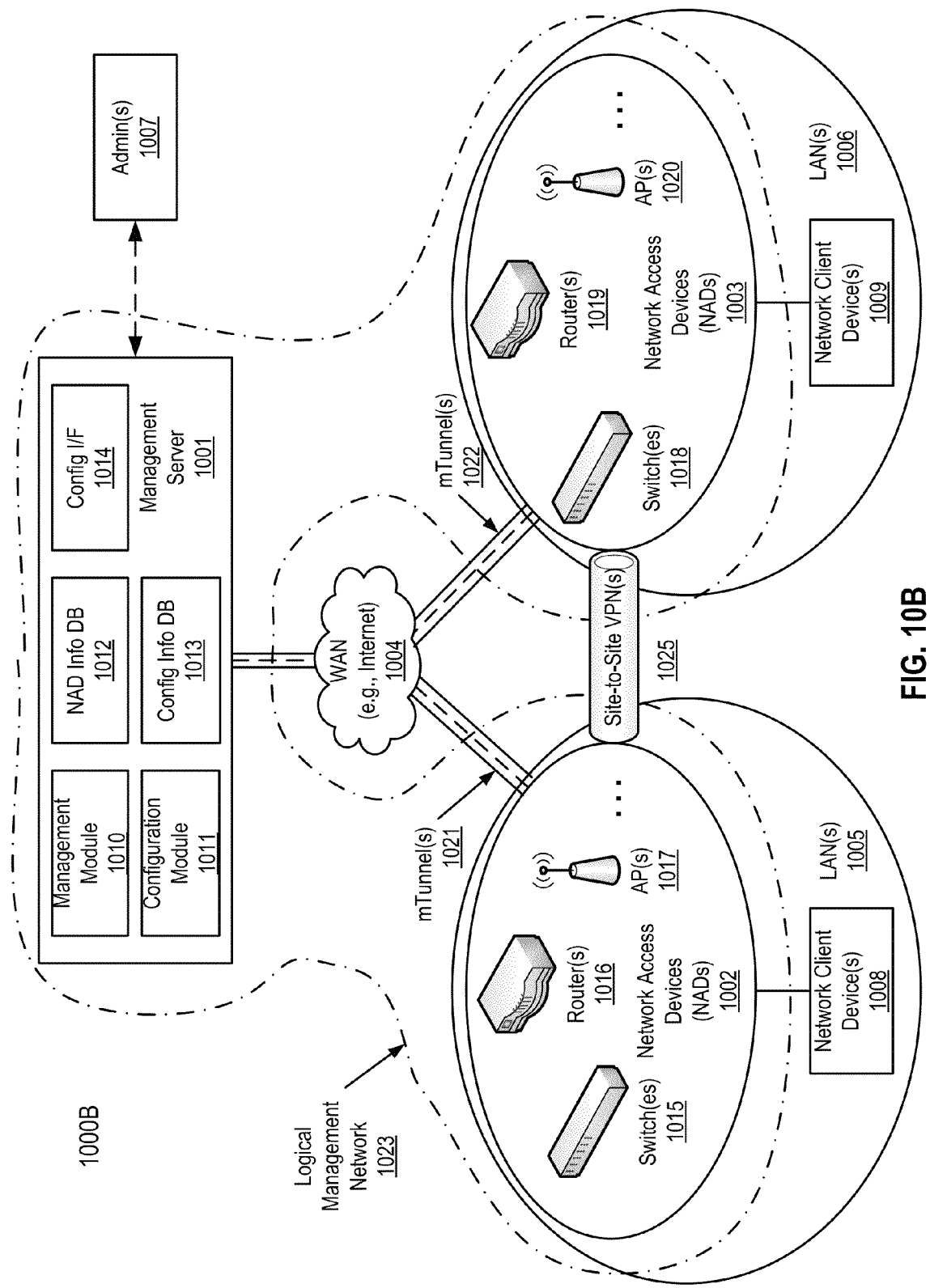

Referring back to FIG. 10A, as described above, network access devices 1002 and network access devices 1003 may be associated with different organizations and managed by management servers 1001. In other configurations, network access devices 1002 and network access devices 1003 may be associated with the same organization as shown as system 1000B in FIG. 10B. Referring to FIG. 10B, in this configurations, network access devices 1002 and network access devices 1003 may be deployed and located at different sites or geographical locations of the organization. According to one embodiment, at least one virtual private network (VPN) tunnel 1025 is maintained between at least one of network access devices 1002 and at least one of network access devices 1003, also referred to as a site-to-site VPN. Some or all of the network access devices can be configured, via configuration interface 1014, to participate in the site-to-site VPN.

Figure 11:
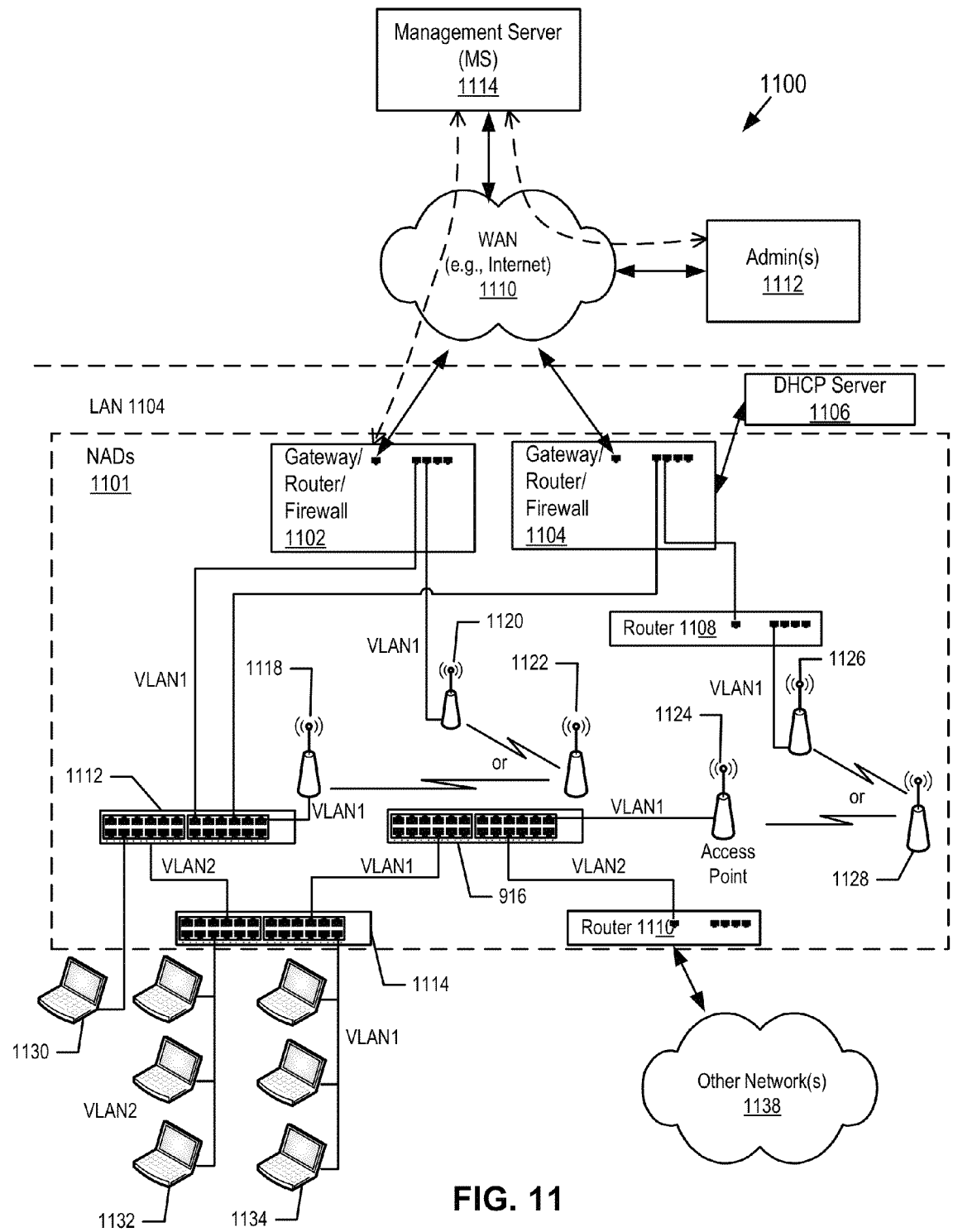
FIG. 11 is a block diagram illustrating a network configuration in accordance with another embodiment of the invention.

FIG. 11 is a block diagram illustrating a network configuration in accordance with an embodiment of the invention. Network configuration 1100 may be implemented as part of network configurations as shown in FIG. 10A and FIG. 10B. The configuration of NADs 1101 represents one possible implementation of one of the LANs 1005 and 1006 of FIG. 10A and FIG. 10B, such as the one including an access network, where one or more of NADs 1101 are in accordance with embodiments of the present invention. That is, any of the routers (e.g., 1102, 1104, 1108 and 1110), network switches (e.g., 1112-1114), and wireless access points (e.g., 1118-1128) shown in FIG. 11 may be implemented by way of the previously described network access devices, including NADs 1002 and 1003 of FIG. 10A and FIG. 10B. FIG. 11 illustrates the complexity and variety of possible configurations that may need to be accounted for by a system administrator (e.g., admin 1112) when configuring a network access device within LAN 1104. For example, LAN 1104 includes multiple gateways to WAN 1110, multiple VLANs, and multiple possible paths to WAN 1110 by many of the NADs 1101. A change in one of the NADs 1101 may require complex configuration changes to one or more of the downstream NADs. To be sure, a configuration change or fault in wireless access point 1120 may result in required configuration changes to wireless access points 1122 and 1118, and network switches 1112 and 1114. Similarly, a configuration change or fault in router 1108 may result in required configuration changes to wireless access points 1126, 1128, and 1124, network switches 1116 and 1114, and router 1110. As is apparent, manual configuration of the network access devices in a network such as LAN 1104 can be complex and extremely error prone. Furthermore, changes to LAN 1104 resulting is a loss of network connectivity may be difficult to diagnose and troubleshoot. Accordingly, embodiments of the present invention disclose allow for an installer to install one or more of NADs 1101 by simply powering on the device and connecting a cable. Then, the NAD may automatically establish a connection to WAN 1110, such that Administrator 1112 may remotely configure NAD 1102 by way of management server 1114. Furthermore, NADs 1101 may be configured to periodically test their connection to WAN 1110 and if it is lost, to automatically establish a new connection to WAN 1110, so as to reduce down time of LAN 1104.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:

maintaining, by a network access device, a hierarchical key combination traffic analysis (HKCTA) table for each of a plurality of client devices to store network traffic statistics of each of the plurality of client devices, wherein the HKCTA includes a plurality of entries comprising first fields defining key identifiers for a plurality of keys and second fields comprising traffic attributes extracted from packet attributes which are to be combined in forming respective ones of the plurality of keys, each key being formed based on a combination of traffic attributes dynamically determined from packet attributes associated with a packet exchanged by a respective client device, wherein each key is formed based on a unique combination of packet attributes having at least one non-overlapped packet attribute compared to a remainder of the plurality of keys, wherein each key represents one of a plurality of hierarchical levels of a hierarchy of the plurality of entries, wherein each level of the hierarchy includes packet attributes of its parent hierarchical level plus at least one additional packet attribute that is not present in its parent hierarchical level, and wherein each hierarchical level excludes at least one packet attribute of its child hierarchical level when there is any child hierarchical level; and in response to a first packet exchanged by a first of the client devices, inspecting, by a packet inspector of the network access device, a packet attribute associated with the first packet;

identifying a plurality of entries of a first HKCTA table associated with the first of the client devices, wherein the entries of the first HKCTA table are identified based on a plurality of first keys representing combinations of traffic attributes from packet attributes associated with the first packet;

populating, by a traffic analysis (TA) module of the network access device, the plurality of entries of the first HKCTA table with traffic attributes extracted from network traffic data obtained from the packet attributes associated with the first packet to yield a populated HKCTA table, the network traffic data including an amount of traffic carried by the first packet transmitted or received by the first of the client devices, wherein entries in the populated HKCTA table represent network traffic statistics.

2. The method of claim 1, wherein each of the plurality of network access devices maintains a management tunnel (mTunnel) with a remote management server to exchange network management messages concerning operations of the associated network access device, wherein each of the plurality of network access devices is to periodically transmit information of its HKCTA table to the remote management server via a corresponding mTunnel to be aggregated into an aggregated HKCTA table, and wherein the remote management server provides a network management tool via a Web interface to allow a user to perform a network traffic analysis based on statistics information obtained from the aggregated HKCTA table.

3. The method of claim 1, wherein identifying a plurality of entries of a first HKCTA table associated with the first one of client devices comprises:
generating the plurality of first keys based on the packet attributes of the first packet in view of a key definition table, the key definition table specifying which of the packet attributes of the first packet should be combined to generate the first keys; and
searching in the first HKCTA table to locate the entries of the first HKCTA table based on the first keys.

4. The method of claim 3, wherein the key definition table comprises a plurality of key entries, each key entry corresponding to a key type that is defined based on a unique combination of one or more packet attributes, wherein each key entry comprises:
a first field to store a key-type identifier identifying a unique key type; and
a plurality of second fields each corresponding to one of the plurality packet attributes, wherein each of the second fields stores an indicator to indicate whether the corresponding packet attribute should be combined to construct a key that is identified by the corresponding key-type identifier.

5. The method of claim 4, wherein the one or more packet attributes defined in the key definition table comprise a hostname representing a Web site accessed by a client device, a port number representing one of a transport control protocol (TCP) and a user datagram protocol (UDP) port specified in packets, and a protocol identifier identifying a network protocol used by packets.

6. The method of claim 1, wherein each entry of the first HKCTA table comprises:
a first field to store a recent traffic measure of a device associated with the HKCTA table;
a second field to store an amount of traffic received by the device (RX traffic count);
and a third field to store an amount of traffic transmitted by the device (TX traffic count).

7. The method of claim 6, wherein populating the identified entries of the first HKCTA table comprises:
for each of the entries corresponding to the first keys that have been found in the first HKCTA table, incrementing the traffic measure by an amount of traffic carried by a payload of the first packet;
incrementing the RX traffic count by the amount of traffic carried by the payload of the first packet if the first packet is received by the first one of client devices; and
incrementing the TX traffic count by the amount of traffic carried by the payload of the first packet if the first packet is transmitted by the first one of client devices.

8. The method of claim 7, further comprising: determining whether there is space for a new entry when no entry corresponding to any of the first keys is found in the first HKCTA table; and
creating one or more new entries in the first HKCTA table to store network traffic data of the first packet when there is space for a new entry in the first HKCTA table, including the traffic measure, the RX traffic, and the TX traffic associated with the first packet.

9. The method of claim 8, further comprising:
decrementing the traffic measure of all entries in the first HKCTA table by the amount of traffic carried by the payload of the first packet when there is no space for a new entry in the first HKCTA table; and
removing at least one entry from the first HKCTA table when its traffic measure drops below a predetermined threshold to make room for a new entry.

10. The method of claim 6, further comprising periodically, according to a predetermined schedule, decrementing the traffic measure for all entries of the first HKCTA table by a predetermined factor.

11. The method of claim 10, wherein decrementing the traffic weight for all entries of the first HKCTA table comprises dividing the traffic measure of each entry by two.

12. The method of claim 10, wherein the traffic measure of each entry is decremented by the predetermined factor for every 20 minutes.

13. The method of claim 1, wherein the first packet represents traffic data of a plurality of second packets monitored and stored in a flow table, and wherein traffic data of the flow table is periodically incorporated into the first HKCTA table according to a predetermined schedule without having to update the HKCTA table for every packet exchanged by the first one of client devices.

14. The method of claim 13, further comprising:
periodically transmitting network traffic statistics represented by the first HKCTA table to a remote management server over a network, wherein the network access device is one of a plurality of network access devices managed by the management server, and wherein the remote management server is to incorporate the network traffic statistics into an aggregated traffic analysis (TA) table maintained by the remote management server, wherein traffic data is periodically incorporated into the first HKCTA.

15. The method of claim 1, wherein the first HKCTA table comprises: a first entry representing a root hierarchical level to store all types of traffic statistics that are not specifically associated with any of the packet attributes;
a second entry representing a first child hierarchical level to the root hierarchical level based on a first protocol, wherein the second entry stores statistics of traffic transported using the first protocol; and
a third entry representing a second child hierarchical level to the first child hierarchical level based on a port number, wherein the third entry stores statistics of traffic transported via the port number using the first protocol associated with the second entry, and wherein the first entry, the second entry, and the third entry form a first hierarchy of the first HKCTA table.

16. The method of claim 15, wherein the port number is a lower port number between a source port number and a destination port number of the first packet.

17. The method of claim 15, wherein the first HKCTA table further comprises:
a fourth entry representing a third child hierarchical level to the root hierarchical level based on a hostname, wherein the fourth entry stores statistics of traffic exchanged between the first client device and a destination represented by the hostname; and
a fifth entry representing a fourth child hierarchical level to the third child hierarchical level based on a second protocol, wherein the fifth entry stores statistics of traffic using the second protocol exchanged between the first client device and the destination represented by the hostname, and wherein the first entry, the fourth entry, and the fifth entry form a second hierarchy of the first HKCTA table.

18. The method of claim 17, further comprising automatically discovering the hostname, including: attempting to capture the hostname from a domain name system (DNS) request initiated from the first one of client devices;
    capturing the hostname from a hypertext transport protocol (HTTP) request transmitted from the first one of client devices when the attempt to capture the hostname from the DNS request is unsuccessful; and
    determining the hostname from a secure socket layer (SSL) certificate when the host name cannot be ascertained from the HTTP request.

19. A non-transitory computer-readable medium having instructions stored therein, which when executed by a processor, cause the processor to perform operations comprising:
    maintaining, by a network access device, a hierarchical key combination traffic analysis (HKCTA) table for each of a plurality of client devices to store network traffic statistics of each of the plurality of client devices, wherein the HKCTA table includes first fields comprising key identifiers representing a plurality of entries identified by a plurality of keys and second fields comprising traffic attributes extracted from packet attributes which are to be combined in forming respective ones of the plurality of keys, each key being formed based on a combination of packet attributes, wherein each key is formed based on a unique combination of packet attributes dynamically selected based on current traffic and having at least one non-overlapped packet attribute compared to a remainder of the plurality of keys, wherein each key represents one of a plurality of hierarchical levels of a hierarchy of the plurality of entries, wherein each level of the hierarchy includes all packet attributes of its parent hierarchical level plus at least one additional packet attribute that is not present in its parent hierarchical level, and wherein each hierarchical level excludes at least one packet attribute of its child hierarchical level when there is any child hierarchical level;
    in response to a first packet exchanged by a first of the plurality of client devices, inspecting, by a packet inspector of the network access device, a plurality of packet attributes associated with the first packet;
    identifying a plurality of entries of a first HKCTA table associated with a first one of the plurality of client devices, wherein the entries of the first HKCTA table are identified based on a plurality of first keys representing combinations of the packet attributes associated with the first packet;
    populating, by a traffic analysis (TA) module of the network access device, the identified entries of the first HKCTA table based on network traffic data obtained from the identified packet attributes, the network traffic data including an amount of traffic carried by the first packet transmitted or received by the first one of the plurality of client devices; and
    periodically transmitting network traffic statistics represented by the first HKCTA table to a remote management server, wherein the network access device is one of a plurality of network access devices managed by the remote management server, and wherein the remote management server is to incorporate the network traffic statistics into an aggregated TA table maintained by the remote management server.

20. The non-transitory computer-readable medium of claim 19, wherein each of the plurality of network access devices maintains a management tunnel (mTunnel) with the remote management server to exchange network management messages concerning operations of the associated network access device, wherein each of the plurality of network access devices is to periodically transmit information of its HKCTA table to the management server via a corresponding mTunnel to be aggregated into the aggregated TA table, and wherein the remote management server provides a network management tool via a Web interface to allow a user to perform a network traffic analysis based on statistics information obtained from the aggregated TA table.

21. The non-transitory computer-readable medium of claim 19, wherein identifying a plurality of entries of a first HKCTA table associated with the first one of the plurality of client devices comprises:
    generating the plurality of first keys based on the packet attributes of the first packet in view of a key definition table, the key definition table specifying which of the packet attributes of the first packet should be combined to generate the first keys; and
    searching in the first HKCTA table to locate the entries of the first HKCTA table based on the first keys.

22. A method comprising:
    maintaining a persistent network connection between a management server and network access devices, wherein each network access device is one of a gateway device, a network switch, and an access point (AP) providing network access to devices;
    receiving network traffic statistic information of devices from the plurality of network access devices via respective persistent network connections, wherein the network traffic statistic information is obtained from hierarchical key combination traffic analysis (HKCTA) tables associated with the devices and maintained by the network access devices, wherein each HKCTA table includes first fields comprising key identifiers representing a plurality of entries identified by a plurality of keys and second fields comprising traffic attributes extracted from packet attributes which are to be combined in forming respective ones of the plurality of keys, each key being formed based on a combination of packet attributes of a network flow associated with packets exchanged by a corresponding device, wherein each key is formed based on a unique combination of packet attributes having at least one non-overlapped packet attribute compared to a remainder of the plurality of keys, wherein each key represents one of a plurality of hierarchical levels of a hierarchy of the plurality of entries, wherein each level of the hierarchy includes all packet attributes of its parent hierarchical level plus at least one additional packet attribute that is not present in its parent hierarchical level, and wherein each hierarchical level excludes at least one packet attribute of its child hierarchical level when there is any child hierarchical level;
    incorporating the network traffic statistic information received from the network access devices into an aggregated traffic analysis (TA) table maintained by the management server; and
    providing network traffic analysis tools via a Web interface to allow a user to display the aggregated network traffic statistic information from the aggregated TA table in a graphical manner.

23. The method of claim 22, wherein each of the plurality of network access devices exchanges via the respective persistent network connection network management messages concerning operations of the network access device.

24. The method of claim 22, wherein each of the network access devices is to periodically transmit information of its HKCTA table to the management server via a corresponding persistent network connection.

* * * * *